United States Patent [19]

Sardana

[11] Patent Number: 5,012,469

[45] Date of Patent: Apr. 30, 1991

[54] ADAPTIVE HYBRID MULTIPLE ACCESS PROTOCOLS

[76] Inventor: Karamvir Sardana, 49/42 Punjabi Bagh, New Delhi 110 026, India

[21] Appl. No.: 226,210

[22] Filed: Jul. 29, 1988

[51] Int. Cl.$^5$ .............................................. H04J 3/16
[52] U.S. Cl. .................................. 370/95.3; 370/85.2; 370/94.1; 370/95.1; 370/104.1
[58] Field of Search ..................... 340/825.5, 825.51; 370/104.1, 95.3, 85.2, 94.1, 93, 80, 85.7, 95.1

[56] References Cited

U.S. PATENT DOCUMENTS

| | | | |
|---|---|---|---|
| 4,504,946 | 3/1985 | Raychaudhuri | 370/104 |
| 4,574,378 | 3/1986 | Kobayashi | 370/104 |
| 4,688,217 | 8/1987 | Ishi et al. | 370/104 |
| 4,736,371 | 4/1988 | Tejima et al. | 370/95 |
| 4,745,599 | 5/1988 | Raychaudhuri | 370/94 |
| 4,766,591 | 8/1988 | Huang | 370/85 |
| 4,773,065 | 9/1988 | Kobayashi et al. | 370/85 |
| 4,774,707 | 9/1988 | Raychaudhuri | 370/95 |

OTHER PUBLICATIONS

Borganovo and Fratta, "SRUC: A Tech. for Packet Trans. on Mul. Access Chs.," Proc. Int. Conf. Comput. Commun., Kyoto Japan, pp. 601–607, 9/78.
Tasaka and Ishida, "Perf. Analysis of SRUC Protocol with GBN ARQ Scheme for Satellite Broadcast Chs.," Conf. Proc. IEEE Globecom., pp. 349–354, 1984.
Tasaka, "Multiple-Access Protocols for Satellite Packet Comm. Networks: A Perf. Comp.," Proc. IEEE, vol. 72, No. 11, pp. 1573–1582, 11/84.
Tasaka, "Perf. Analysis of Multiple Access Protocols," The MIT Press, Cambridge, Mass., chs. 7 and 9, 1986.
Lee and Mark, "Comb. Rand./Res. Access for Packet Sw'd. Trans. over a Satellite with On-Board Proc.: Pt. I–Global Beam Satellite," IEEE Trans. Commun., vol. COM-31, No. 10, pp. 1161–1171, 10/83.
Suda, Miyahara and Hasegawa, "Perf. Eval. of an Int. Access Scheme in a Satellite Com. Ch.," IEEE J. on Sel. Areas in Commun.-Spec. Issue on Dig. Satellite Comms., vol. SAC-1, No. 1, pp. 153–164, 1/83.
Binder, "A Dynamic Packet-Sw'ing Sys. for Satellite Broadcast Chs.," Conf. Proc. IEEE ICC, pp. 41.1–41.5, 1975.
Balagangadhar and Pickholtz, "Analysis of a Res. Mult. Access Tech. for Data Trans. Via Satellites," IEEE Trans. Commun., vol. COM-27, No. 10, pp. 1467–1475, 10/79.

*Primary Examiner*—Douglas W. Olms
*Assistant Examiner*—Alpus H. Hsu
*Attorney, Agent, or Firm*—Martin J. McKinley

[57] ABSTRACT

A class of adaptive hybrid multiple access protocols for a single channel, time division communications network dynamically switches among contention (Aloha), reservation, and fixed assignment (TDMA) protocols as a function of the traffic on the channel. This class of protocols is referred to as "Aloha-Reservation-TDMA" or "ART" class protocols. Within the ART class, a subclass of protocols is defined for satellite communication networks. This subclass is referred to as "Adaptive Satellite Hybrid Access" or "ASHA," and two examples of protocols within the ASHA subclass are described to show the viability of the ART class protocols. These protocols are referred to as ASHA1 and ASHA2. Both the ASHA1 and ASHA2 protocols combine the features of S-ALOHA, TDMA-Reservation and TDMA protocols. The ASHA1 protocol transmits reservation information when the Aloha protocol is selected, but the ASHA2 protocol does not. An Aloha/Reservation adaptive hybrid protocol is described in which the switch from the Reservation protocol to the Aloha protocol occurs when a reservation queue has been clear for a predetermined non-zero number of time slots. A Reservation/TDMA adaptive hybrid protocol is described in which the switch between the Reservation protocol and the TDMA protocol occurs when a predetermined number of stations on the network have transmitted information packets within a window. An Aloha/TDMA adaptive hybrid protocol is also described in which the switch from the Aloha protocol to the TDMA protocol occurs when a predetermined number of information packets have collided within a window.

23 Claims, 18 Drawing Sheets

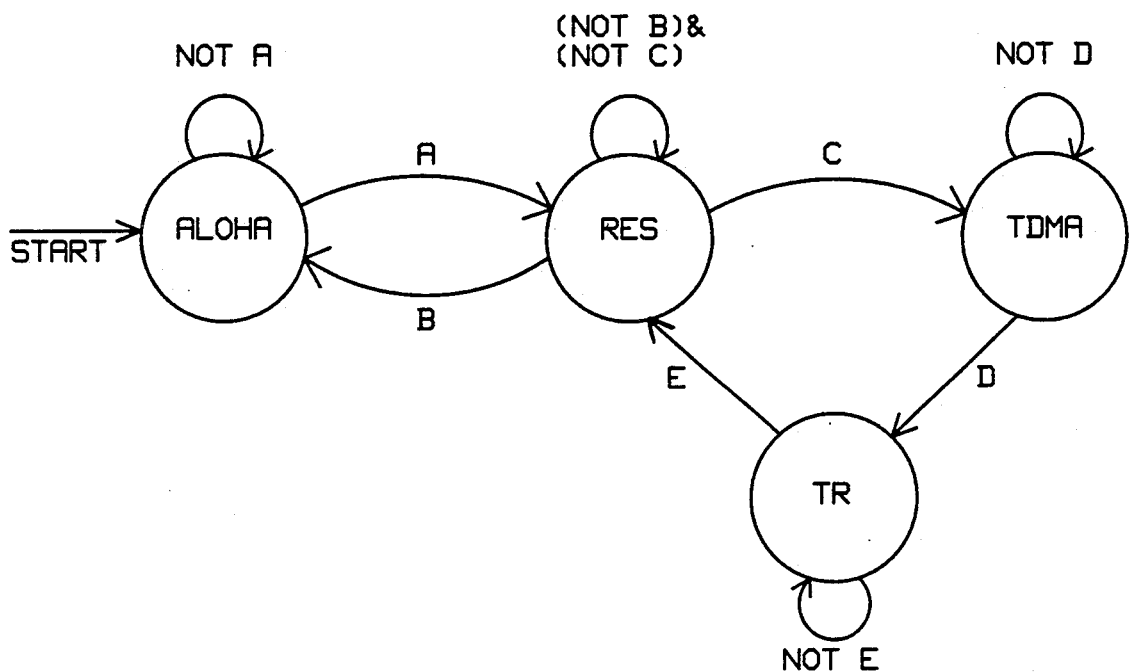

LEGEND:

A — FIRST RI RECEIVED AFTER DETECTION OF THE FIRST COLLISION BY USERS

B — RESERVATION GLOBAL QUEUE STAYS CONTINUOUSLY CLEAR FOR $\geq t_{ra}$ LARGE SLOTS C — NUMBER OF DIFFERENT USERS WHO TRANSMITTED PACKETS DURING THE SLIDING WINDOW OF MOST RECENT M*h LARGE SLOTS IS $> t_{rt}$ D — NUMBER OF (DIFFERENT) USERS WHO TRANSMITED PACKETS DURING THE SLIDING WINDOW OF MOST RECENT M DATA SLOTS IS $< t_{tr}$ ($t_{tr} < t_{rt}$)

E — AFTER AN ELAPSED DURATION OF J+1 LARGE SLOTS IN TR STATE, BY WHICH TIME THE GLOBAL QUEUE, HOPEFULLY, BUILDS UP (J LARGE SLOTS REPRESENT THE DURATION OF ONE ROUND TRIP PROPAGATION DELAY)

*FIG. 5*

| STATE | | | |
|---|---|---|---|
| FROM | TO | | TRAFFIC MEASURE USED |
| 1. ALOHA | RES (ASHA1) AR (ASHA2) | $T_{AR}$ = | NUMBER OF COLLISIONS (FOLLOWED BY FIRST RI) |
| 2. RES | ALOHA | $T_{RA}$ = | NUMBER OF LARGE SLOTS FOR WHICH GQ STAYS CONTINUOUSLY CLEAR |
| 3. RES | TDMA | $T_{RT}$ = | NUMBER OF DIFFERENT USERS IN SLIDING RES SCAN WINDOW |
| 4. TDMA | TR | $T_{TR}$ = | NUMBER OF DIFFERENT USERS IN SLIDING TDMA SCAN WINDOW |

*FIG.6A*

| FRAME SIZE, L | $t_{ra}$ | $V*(1+t_{ra})$ | $t_{rt}/t_{tr}$ |
|---|---|---|---|
| 5 | 0 | 20 | 40/30 |
| 10 | 1 | 20 | 70/60 |
| 20 | 5 | 30 | 80/70 |
| 50 | 8 | 18 | 80/70 |
| 100 | 10 | 11 | 95/85 |

*FIG.6B*

| | | | |
|---|---|---|---|
| 5 | 0 | 20 | 40/30 |
| 10 | 1 | 20 | 70/60 |
| 20 | 5 | 30 | 80/70 |

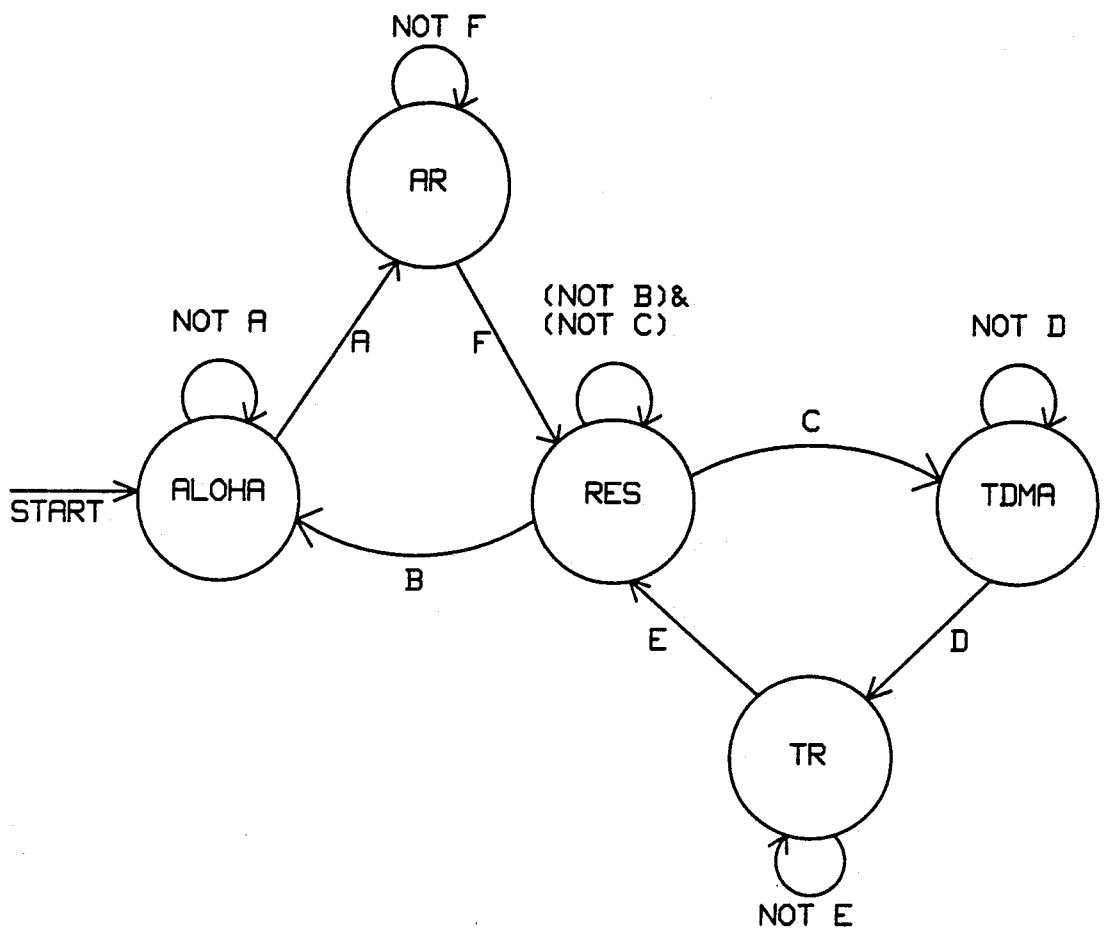

LEGEND:

A — FIRST COLLISION DETECTED BY USERS

B — RESERVATION GLOBAL QUEUE STAYS CONTINUOUSLY CLEAR FOR $\geq t_{ra}$ LARGE SLOTS C — NUMBER OF DIFFERENT USERS WHO TRANSMITTED PACKETS DURING THE SLIDING WINDOW OF MOST RECENT M*h LARGE SLOTS IS $> t_{rt}$ D — NUMBER OF (DIFFERENT) USERS WHO TRANSMITTED PACKETS DURING THE SLIDING WINDOW OF MOST RECENT M DATA SLOTS IS $< t_{tr}$ ($t_{tr} < t_{rt}$)

E — AFTER AN ELAPSED DURATION OF J+1 LARGE SLOTS IN TR STATE, BY WHICH TIME THE GLOBAL QUEUE, HOPEFULLY, BUILDS UP (J LARGE SLOTS REPRESENT THE DURATION OF ONE ROUND TRIP PROPAGATION DELAY)

F — GLOBAL QUEUE BUILDS UP i.e. ON RECEIPT OF THE FIRST RI BY THE USERS

FIG. 8

ADAPTIVE HYBRID MULTIPLE ACCESS PROTOCOLS

BACKGROUND OF THE INVENTION

This invention pertains to time division, multiple access communications systems in which a plurality of stations share a single transmission channel. More particularly, this invention pertains to an adaptive hybrid communications system in which two or more of the contention, reservation and fixed assignment protocols are utilized.

When a communications system includes a plurality of stations transmitting and receiving information on the same channel, the channel must be organized in some fashion to achieve efficient use of the single channel. There are a number of "protocols" that have been used in the past that provide such organization and these protocols are referred to as "multiple access protocols" or "MAPs".

These protocols can be implemented using a central controller, or their implementation can be distributed. With distributed control, each station executes its own protocol routine, which is synchronized and essentially identical to the protocol routines of all other stations on the network. Although the preferred embodiments of the invention described below are directed to MAPs with distributed control, it should be understood that, with minor modifications, implementation of any of these protocols can be performed by a central controller.

There are three basic classes of MAPs: contention, reservation and fixed assignment. Contention protocols are also referred to as "Aloha-type" protocols and fixed assignment as "TDMA-type" (time division multiple access-type) protocols. Consequently, the term "Aloha" will be used throughout the specification and claims to refer to contention protocols, while the term "TDMA" will be used to refer to fixed assignment protocols.

In each of these protocol classes, the channel is usually divided in time into slots and information is transmitted in packets, one packet per time slot. In general, each of these protocols establishes a set of rules that determines which station will transmit its packet of information in a particular time slot. Each of these protocols are described in greater detail below.

MAPs have a variety of applications. For example, among computer communication network, MAPs are used in local area networks (LANs), radio networks, telephone networks, satellite communications networks (SCNs), metropolitan area networks, integrated services digital networks and other well known networks, including hybrid ones. When MAPs are implemented in SCNs, additional complications arise because of the large round trip propagation delay between the transmission of an information packet and the time that information packet is received by the ground stations. For SCNs in which the satellite is in geosynchronous orbit, this propagation delay is typically 0.27 seconds. In contrast, this propagation delay between transmission and reception of an information packet on a LAN may be, for all practical purposes, zero. As a result of this propagation delay, MAPs need special considerations when implemented in an SCN. Accordingly, the preferred embodiments of the invention described below are directed to the implementation of MAPs in an SCN. It should be understood, however, that implementation of any one of the preferred embodiments in another type of network simply requires appropriate adjustment of the propagation delay factors, or, in networks in which the propagation delay is essentially zero, the MAPs described below can be simplified by eliminating the additional steps that compensate for the round trip propagation delay.

Aloha Protocols

When using an Aloha protocol such as S-ALOHA, each station on the network can potentially transmit a packet of information in any time slot. As a general rule, when a packet of information becomes available for transmission at a particular station, that station begins transmitting the packet at the start of the next time slot. Each station transmits packets of information without any knowledge that another station on the network may also be transmitting a different packet in the same time slot. Thus, two or more stations can transmit their respective packets of information in the same time slot, resulting in a "collision". When a collision occurs between two (or more) packets, neither packet will be successfully transmitted and both must be retransmitted in a later time slot. The retransmission strategy of the protocol usually includes adequate safeguards such that the probability is low that the retransmission of the collided packets will collide a second time.

The performance of a typical Aloha protocol as well as the performance of typical reservation and TDMA protocols is illustrated in FIG. 1, in which the throughput is plotted on the horizontal axis, while the average message delay is plotted on the vertical axis. Throughput signifies the fraction of time that the channel is being used for the transmission of successful (non-colliding) information packets. When the throughput is one (1), every time slot is being used to transmit information packets and information packets only, and every information packet is being transmitted successfully, i.e., without collision. Average message delay signifies the average time required to transmit a complete message, i.e., a group of information packets. Obviously, higher throughput and lower average message delay times are desired. Aloha protocols typically exhibit low average message delay times at low traffic levels, and low maximum throughput. Average message delay at low traffic levels is low because messages are transmitted immediately after they become available at the station and are transmitted successfully without collisions, while the maximum throughput (also called channel capacity) is low because excessive collisions result in wasted time slots at high traffic levels.

Reservation Protocols

Reservation protocols either implicitly or explicitly reserve particular time slots for specific stations based on the need of that station to transmit information packets. The single channel is typically divided in time into frames, with each frame including a plurality of time slots. In implicit reservation protocols, such as R-ALOHA, a station transmits the first information packet in a random, previously unreserved time slot as in S-ALOHA protocol. If the transmission of that first packet is successful, i.e., if there has been no collision, then that particular time slot used to transmit the first packet is reserved for that station in subsequent frames until that station voluntarily relinquishes the reserved slot.

In explicit reservation protocols, a station transmits an explicit reservation indicating that it has information packets to transmit and requesting the reservation of time slots within which to transmit this information. For example, in TDMA-Reservation (TDMA-Res) protocols, each time slot includes a number of reservation minislots, the total number of reservation slots per frame usually being equal to or sometimes greater than the total number of stations operating on the network. Each of these reservation minislots is assigned to a particular station. Thus, each station can transmit a reservation request without fear of a collision with a reservation request transmission from another station. Reservations from all stations are placed in a Global Queue, which assigns specified time slots to stations that requested a reservation, for example, on a first-in first-out (FIFO) basis. With distributed control and processing, this Global Queue is maintained by each and every station on the network. This is possible since each station receives the reservation information from all other network stations. This includes receiving its own reservation information one round trip propagation delay from the time the reservation request is transmitted.

The performance of a typical reservation protocol, such as TDMA-Res protocol, is illustrated in FIG. 1. An examination of this figure indicates that throughput of a typical reservation protocol is improved over that of a typical Aloha protocol. This is because collisions have either been greatly reduced, as in implicit reservation protocols, or completely eliminated, as in explicit reservation protocols such as TDMA-Res. But unity channel capacity can not be reached in a reservation protocol, because some collisions still occur in implicit reservation protocols and, because a considerable portion of the channel time is being used to transmit reservation information in explicit reservation protocols. The average message delay for reservation protocols is typically longer than that for Aloha protocols, because a station must first request a reservation, either implicitly or explicitly, before information packets can be transmitted.

TDMA Protocols

TDMA protocols divide the channel in time into a plurality of frames, with each frame including a number of information time slots equal to or greater than the total number of stations operating on the network. Each station is assigned a unique time slot within which to transmit its information packets and transmissions in any other time slot are not permitted.

As illustrated in FIG. 1, the throughput of a TDMA protocol can, theoretically, be unity. This is because, theoretically, 100% of the channel time is being utilized to transmit information packets. Since only one packet per station can be transmitted in each frame, however, average message delay is high.

Adaptive and Hybrid Protocols

There have been many modifications of the above described classes of multiple access protocols. Such modifications can be described as either basic adaptive multiple access protocols or adaptive hybrid multiple access protocols (AHMAPs). Basic adaptive protocols are protocols that dynamically change their operating parameters as a function of the traffic on the network. Basic adaptive protocols, however, only operate within one class of MAP. AHMAPs, on the other hand, operate implicitly or explicitly over more than one class of MAP.

Adaptive hybrid multiple access protocols can be classified according to which basic classes of MAPs they utilize. Heretofore, AHMAPs have only combined two of the three basic classes of MAPs; specifically, Aloha/Reservation; Aloha/TDMA; and Reservation/TDMA. Each of these three classes of AHMAPs will now be described in greater detail.

Aloha/Reservation

The "SRUC" or "Split Reservation Upon Collision" protocol is a combination of S-ALOHA and TDMA-Res protocols. Referring to FIG. 2A, the channel in the SRUC protocol is divided into frames, which are further divided into a plurality of "large slots". Each large slot includes a data slot and a plurality of "minislots" in which reservation information is transmitted. Each station is assigned its own unique minislot such that any station can transmit its reservation information in its assigned minislot without fear of colliding with another station's reservation information transmission. Thus, reservation information is transmitted in TDMA fashion. This is true regardless of the protocol (Aloha or Reservation) used to transmit information in the data slots. Since each station is assigned its own minislot, the total number of minislots per frame is equal to (or greater than) the total number of stations operating on the network.

The SRUC protocol begins by transmitting data in the data slots in the Aloha state according to S-ALOHA protocol. In addition to data packets, reservation information is also transmitted while in the Aloha protocol state. If a collision occurs between two or more data packets, then on receipt of the first RI (reservation information) the SRUC protocol switches to the Reservation state in which the packet transmissions take place according to TDMA-Res protocol. Since reservation information has already been sent in the Aloha state, a Global Queue of reservation information has already been built up such that slot assignments can immediately begin upon entering the Reservation state. When this reservation Global Queue becomes empty, i.e., no station has a reservation to transmit a data packet, the SRUC protocol switches back to the Aloha state.

Although it was previously thought that the SRUC protocol was stable over all traffic conditions, extensive analysis performed by the applicant has shown that the SRUC protocol is, in fact, unstable under certain conditions. This instability exhibits itself in the form of "protocol oscillations" in which the SRUC protocol oscillates back and forth between the Aloha and Reservation states. Proof of this instability is found in the applicant's publication entitled "Adaptive Hybrid Multiple Access Protocols With Satellite Network Applications," Doctoral Dissertation, Florida Atlantic University, Boca Raton, Fl., 1987. This document is wholly incorporated by reference herein. A solution to this protocol oscillation problem is described in the "Description of the Preferred Embodiments", below.

This SRUC protocol is also described in the following documents:

F. Borgonovo and L. Fratta, "SRUC: A Technique for Packet Transmission on Multiple Access Channels," Proc. Int. Conf. Comput. Commun., Kyoto, Japan, pp. 601–607, September 1978.

S. Tasaka and K. Ishida, "Performance Analysis of the SRUC Protocol with a Go-Back-N ARQ Scheme for Satellite Broadcast Channels," Conf. Proc. IEEE Globecom, pp. 349-354, 1984.

S. Tasaka. "Multiple-Access Protocols for Satellite Packet Communication Networks: A Performance Comparison," Proc. IEEE, Vol. 72, No. 11, pp. 1573-1582, November, 1984.

S. Tasaka, "Performance Analysis of Multiple Access Protocols," The MIT Press, Cambridge, Mass., chapters 7 and 9, 1986.

In the Random/Reservation Protocol, the channel is divided into large slots without any frame structure, as illustrated in FIG. 2B. Each large slot includes a data slot and a plurality of reservation minislots. Since the total number of minislots in each large slot is less than the total number of stations operating on the network, reservations can only be transmitted in the minislots on a contention basis. A scheduler on board the satellite classifies large slots as either "contention" or "reserved". This classification is transmitted to the ground stations in a "trailer" that is tacked on to the end of the data slot. Initially, when a station has a data packet to transmit, it transmits both a reservation and the data in a large contention classified slot; the reservation being transmitted in a randomly selected minislot. When this transmission reaches the satellite, three things can occur. First, if only one reservation is successfully received, data transmission is considered successful (and this data packet is relayed to the ground stations). Second, if more than one reservation is successfully received, a collision has obviously occurred in the data slot and the on board scheduler reserves future slots in which the requesting stations can retransmit their data packets. Third, two or more reservations have collided on the same minislot and these reservations as well as the corresponding data packets must be retransmitted.

A more detailed explanation of the Random/Reservation protocol is presented in the following reference:

H.W. Lee and J.W. Mark, "Combined Random/Reservation Access for Packet Switched Transmission over a Satellite with On-Board Processing: Part I - Global Beam Satellite," IEEE Trans. Commun., Vol. COM-31, No. 10, pp. 1161-1171, October 1983.

The "Integrated Access Scheme," the channel frame for which is illustrated in FIG. 2C, combines S-ALOHA and ALOHA-Reservation protocols. In this scheme, the channel is divided into frames, and the frames are further divided into three regions. The first region includes reservation minislots for the transmission of reservation information on a contention or Aloha basis (hence the name "Aloha-Reservation"). The second region includes data slots for the transmission of data packets on a contention or Aloha basis. The third region also contains data slots, however, data packets are only transmitted in third region data slots when a station has a reservation to do so. The width of the second region is equal to or greater than the round trip propagation delay, such that reservations requested in the first region can be processed and third region data slots can be assigned before the beginning of the third region, which includes the reserved data slots. The Integrated Access Scheme classifies stations into "bursty" and "heavy" traffic categories, with bursty stations using the second region or Aloha data slots, while the heavy traffic stations use the first region to request reservations and the third region to transmit data packets in reserved data slots. The Integrated Access Scheme is described in more detail in the following reference:

T. Suda, H. Miyahara and T. Hasegawa, "Performance Evaluation of an Integrated Access SCheme in a Satellite Communication Channel," IEEE J. on Selected Areas in Commun. — Special Issue on Digital Satellite Communications, Vol. SAC-1, No. 1, pp. 153-164, January 1983.

In another Aloha/Reservation protocol, a station transmits the first packet of a message on a contention basis in a randomly selected idle time slot. This transmission also includes a reservation request to transmit the remaining number of packets in the message. If the request is granted by a central station, idle time slots are assigned to the requesting station such that the remaining data packets can be transmitted on a reservation basis. This scheme is described in more detail in the following document:

U.S. Pat. No. 4,736,371 to S. Tejima et al.

Reservation/TDMA

In one Reservation/TDMA scheme, the channel is divided into frames, which are further subdivided into a plurality of fixed assignment data slots and a plurality of dynamically assigned data slots, as illustrated in FIG. 2D. The total number of fixed assignment data slots is equal to the total number of stations operating on the network. Each fixed assignment data slot is "owned" by one and only one station, and that station is free to transmit in its owned slot at any time. In addition to data, each data slot also includes a minislot for the transmission of reservation information. Initially, a station transmits a data packet and a reservation for the remaining packets in the message in its owned fixed assignment data slot. This reservation information is placed in a queue, and additional slots may be assigned by a central controller to this station to transmit the remaining packets of the message. These additional slots may include one or more of the dynamically assignable slots, or one (or more) of the other owned slots that is not presently being used by its owner. If a station attempts to transmit the first packet of a message and its owned data slot is temporarily being used by another station, the owner of the slot transmits in its owned data slot, resulting in a collision. When the other station detects the collision, it relinquishes the slot to its owner. The owner can retransmit the collided data packet in his owned slot at a later time. This scheme is described in more detail in the following document:

R. Binder, "A Dynamic Packet-Switching System for Satellite Broadcast Channels," Conf. Proc. IEEE ICC, pp. 41.1-41.5, 1975.

In the Reservation Multiple Access (RMA) protocol, the channel is divided into variable length frames, which are further divided into variable length large slots, as illustrated in FIG. 2E. Each of the large slots includes at least one fixed assignment or "pre-assigned" (PA) data slot, plus a variable number of "reservation access" (RA) data slots. Reservations from each user are transmitted as part of the data packet itself, and are transmitted in the last data slot of the large slot. The number of reservation slots RA that are assigned to a station is equal to the reservation request transmitted in the previous frame. This scheme, which is a variation of Binder's scheme, is described in more detail in the following document:

M.M. Balagangadhar and R.L. Pickholtz, "Analysis of a Reservation Multiple Access Technique for Data Transmission via Satellites," IEEE Trans. Commun., Vol. COM-27, No. 10, pp. 1467–1475, October 1979.

Aloha/TDMA

An adaptive multiple access protocol has been proposed which operates in an Aloha state during light traffic and in a TDMA state during heavy traffic. In this scheme, the protocol parameters are adaptively adjusted to maximize channel throughput based on conditional probabilities that each station on the network has a data packet to transmit. This scheme is described in more detail in the following document:

U.S. Pat. No. 4,574,378 to K. Kobayashi.

Additional references are presented in the above described dissertation, which has been wholly incorporated by reference herein. A list of these references begins on page 197 of the dissertation.

In summary, each of the above adaptive hybrid protocols combines two basic MAPs, either Aloha and Reservation, Reservation and TDMA, or Aloha and TDMA. It is known, however, that each of these three basic protocols, Aloha, Reservation and TDMA, provide superior performance at low, medium and high throughputs, respectively, as illustrated in FIG. 1. Accordingly, it would be desirable if a new adaptive hybrid protocol could be developed that switched between all three of the basic MAPs as a function of network traffic. For such a protocol to be useful, one must show, not only the stability of the new protocol over a wide range of network parameters, but also that this new protocol has superior performance over the hybrid protocols that combine only two basic MAPs.

Accordingly, the invention described below is a new class of adaptive hybrid multiple access protocols that combines the three basic MAPs. This class of protocols is referred to as "ARTZ" class protocols, which is an acronym for "Aloha-Reservation-TDMA". Within this class, a subclass of protocols for satellite communication networks is defined. This subclass is referred to as "Adaptive Satellite Hybrid Access" or "ASHA" protocols. Two protocols in the ASHA subclass, which are referred to as ASHA1 and ASHA2, are described below. The stability of the ASHA1 and ASHA2 protocols has been proven over a wide range of network parameters, and the performance of these protocols has been shown to be superior to other protocols that employ only two basic MAPs. Each of the ASHA1 and ASHA2 protocols consistently performs better than any of its individual basic component MAPs over the entire range of throughput. The ASHA1 and ASHA2 protocols also extend the channel capacity to unity. For a discussion of the performance and stability of these protocols, the reader is referred to the above described dissertation, which has been wholly incorporated by reference herein.

The term "data" is used throughout the specification and claims to refer to any type of information, digital or analog. Consequently, data includes other types of information such as voice, facsimile, teletext, videotext, electronic mail and signaling information.

SUMMARY OF THE INVENTION

Briefly, the invention is a communications station for use on a single channel, time division, multiple access network wherein the single channel is divided into a plurality of time slots. The communications station includes selectable Aloha protocol means for transmitting and receiving information packets using an Aloha protocol, and selectable Reservation protocol means for transmitting information packets using a Reservation protocol. Reservation information means are provided for transmitting and receiving reservation information. A reservation queue is included for storing reservation information transmitted on the network and received by the reservation information means. Means for switching from the Reservation protocol to the Aloha protocol when the reservation queue has been clear for a predetermined non-zero number of time slots is also provided.

In another embodiment, the invention is a communications station for use on a single channel, time division, multiple access network wherein the single channel is divided into a plurality of time slots. The communications station includes selectable Reservation protocol means for transmitting and receiving information packets using a Reservation protocol, and selectable TDMA protocol means for transmitting and receiving information packets using a TDMA protocol. Also included are means for switching from the Reservation protocol means to the TDMA protocol means when more than a first predetermined number of stations operating on the network have transmitted information packets within a first predetermined window. The first window is a first predetermined number of recently received time slots.

In another embodiment, the invention is a communications station for use on a single channel, time division, multiple access network wherein the single channel is divided into a plurality of time slots. The communications station includes selectable Aloha protocol means for transmitting and receiving information packets using an Aloha protocol, selectable Reservation protocol means for transmitting and receiving information packets using a Reservation protocol, and selectable TDMA protocol means for transmitting and receiving information packets using a TDMA protocol. A first switching means for switching between the Aloha protocol means and the Reservation protocol means is provided. Also included is a second switching means for switching between the reservation protocol means and the TDMA protocol means.

In still another embodiment, the invention is a communications station for use on a single channel, time division, multiple access network wherein the single channel is divided into a plurality of time slots. The communications station includes selectable Aloha protocol means for transmitting and receiving information packets using an Aloha protocol, and selectable TDMA protocol means for transmitting and receiving information packets using a TDMA protocol. Also included are means for switching from the Aloha protocol means to the TDMA protocol means when a predetermined number of information packets have collided within a first predetermined window. The first window is a first predetermined number of recently received time slots.

BRIEF DESCRIPTION OF THE DRAWINGS

FIG. 5 is a finite state machine model of the ASHA1 protocol.

FIGS. 6A and 6B are tables of the traffic measures and threshold values for the ASHA1 and ASHA2 protocols.

FIG. 8 is a finite state machine model of the ASHA2 protocol.

DESCRIPTION OF THE PREFERRED EMBODIMENTS

Figure 3:
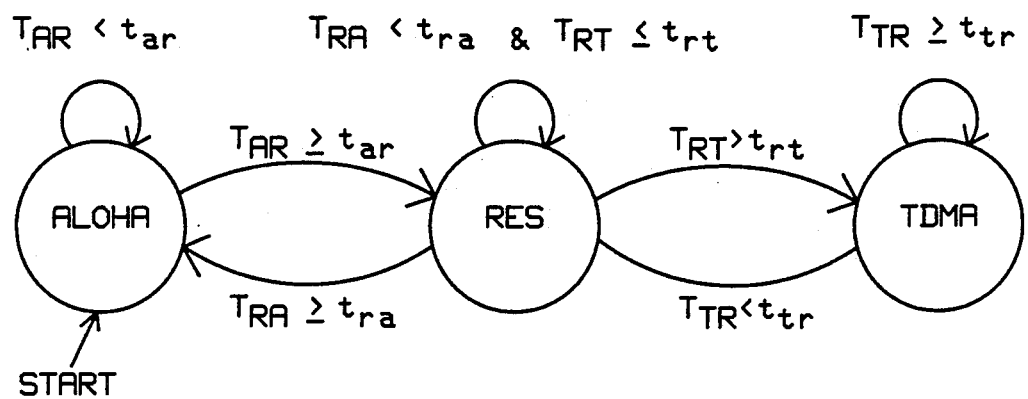
FIG. 3 is a generalized finite state machine model of the ART class protocols.
Figure 2A:
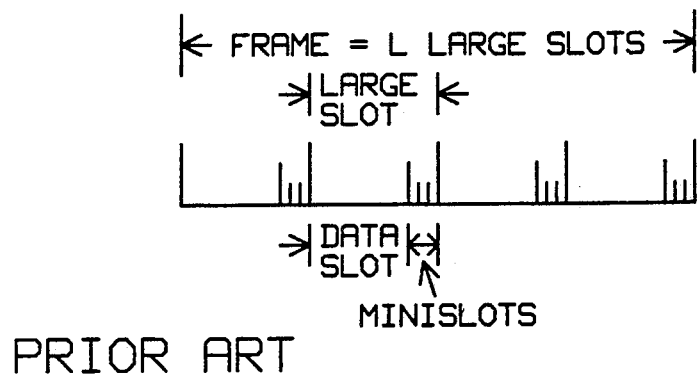
FIGS. 2A–2E are schematic representations of the channel structure for Split Reservation Upon Collision (SRUC), Random/Reservation, Integrated Access Scheme, Binder's Reservation/TDMA scheme, and Reservation Multiple Access (RMA) protocols, respectively.
Figure 2B:
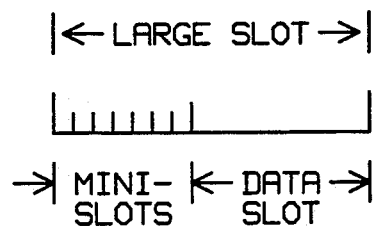
Figure 2C:
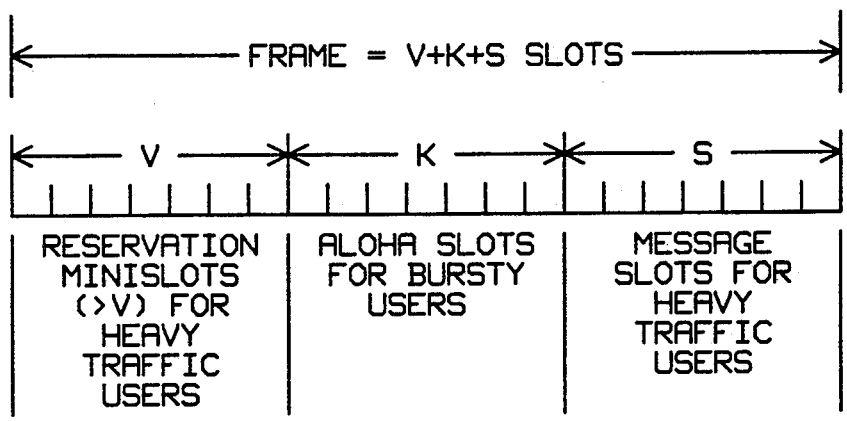
Figure 2D:
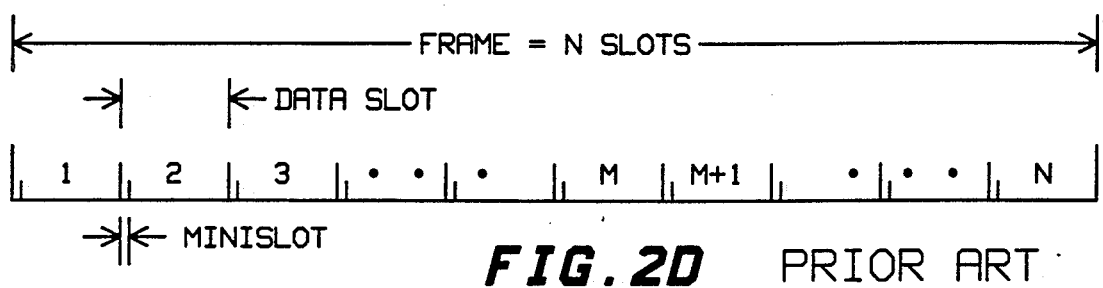
Figure 2E:
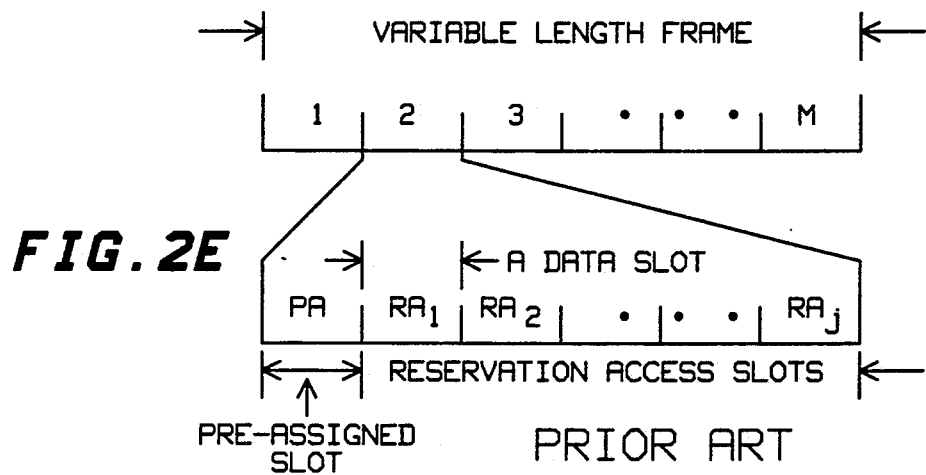

FIG. 3 is a general finite state machine model of the Aloha-Reservation-TDMA (ART) class protocol of the present invention. Referring to this figure, this general class of protocols begins in the Aloha state and remains in that state until a particular measure of traffic on the network, $T_{AR}$, equals or exceeds the threshold value $t_{ar}$. For example, the traffic measure $T_{AR}$ may be the collision of two or more data packets and the threshold value $t_{ar}$ may be set at 1. Thus, if one or more collisions of data packets occur, the ART class protocol switches to the Reservation (RES) state.

In the Reservation state, there are two traffic measures, $T_{RA}$ and $T_{RT}$. If traffic measure $T_{RA}$ is greater than or equal to the threshold value $t_{ra}$, the protocol reverts to the Aloha state. If traffic measure $T_{RT}$ is greater than the threshold value $t_{rt}$, the protocol switches to the TDMA state. If neither of these conditions occur, the protocol remains in the Reservation state. Similarly, if the protocol is in the TDMA state, the protocol remains in that state unless the traffic measure $T_{TR}$ is less than the threshold value of $t_{tr}$, at which time the protocol switches back to the Reservation state.

In this general class of ART protocols, the particular traffic measures and corresponding threshold values are not defined. Within this general class, a subclass of protocols called "Adaptive Satellite Hybrid Access" or "ASHA" is defined. (As an aside, ASHA means "hope" in the Hindi language.) The ASHA subclass pertains to satellite communication networks (SCNs) and examples of two protocols within this subclass, which are referred to as "ASHA1" and "ASHA2," are described below. Although the ASHA1 and ASHA2 protocols are directed to satellite communications, they can be readily adapted to communications on other types of networks, as discussed above.

The ASHA1 and ASHA2 protocols described assume distributed control by each station on the network and that all stations are mutually synchronized to each other. Thus, the same protocol routine is executed in each station, except that the random number generation is unique to each station. The protocols assume that all stations are covered by one satellite beam. The preferred embodiments of the ASHA1 and ASHA2 protocols are directed to the use of fixed length data packets and to require that a station can not generate a new message until all of the data packets of the current message have been transmitted and successfully received. It should be understood, however, that with slight modification these protocols can be adapted for use with variable length data packets and a different new message generation scheme.

ASHA1

Figure 4A:
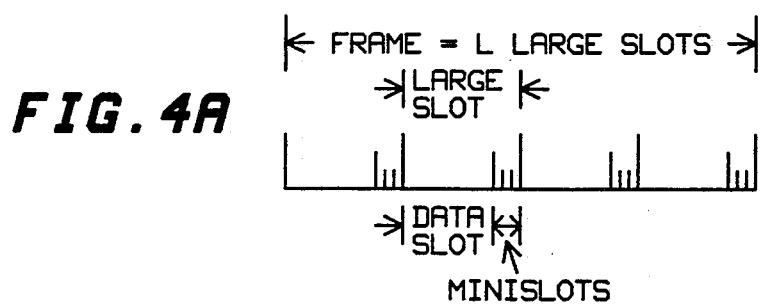
FIGS. 4A and 4B are schematic representations of the channel structure of the ALOHA, Reservation (RES) and TR-Transition states; and the TDMA state of the ASHA1 protocol, respectively.

FIG. 4 is a schematic representation of the channel structure for the ASHA1 protocol. Referring to FIG. 4A, in the Aloha state, Reservation (RES) state, and Transition state (TR), the channel is divided into frames, which are further divided into a plurality of "large slots" of fixed length. Each of these large slots includes a data slot for the transmission of one data packet, and a plurality of minislots for the transmission of reservation information (RI). In this protocol, each station operating on the network is assigned a unique minislot within which to transmit its reservation information. Thus, reservation information is transmitted on a TDMA basis and the total number of minislots per frame must be equal to or greater than the total number of stations operating on the network. Mathematically, if "M" is the total number of stations on the network, "L" is the number of large slots per frame, and "V" is the number of minislots per large slot, then V is the smallest integer greater than or equal to M/L.

Figure 4B:
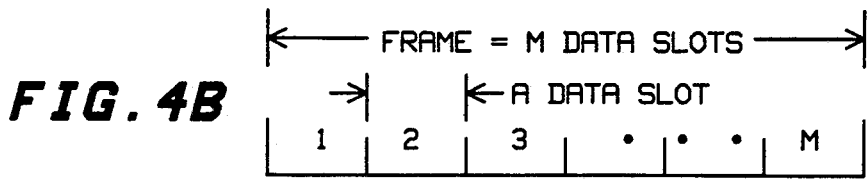

In the TDMA state as shown in FIG. 4B, the channel is divided into frames, which are further divided into a plurality of equal length data slots. Since each station is assigned one particular data slot in each frame in the TDMA state, the number of data slots is preferably equal to the total number of stations M. No reservation information is transmitted in the TDMA state and, consequently, there are no reservation minislots.

FIG. 5 is a finite state machine model of the ASHA1 protocol and FIG. 6 includes tables of the traffic measures and corresponding threshold values. For the ASHA1 and ASHA2 protocols, the threshold values in the tables of FIG. 6 have been optimized for best delay versus throughput performance for a satellite communications system in which there are 100 stations operating on the network and the round trip propagation delay (R) is equivalent to the duration of 12 data slots. These values can be optimized for other network parameters by computer simulation of the protocols as discussed in the dissertation cited above.

Referring to FIGS. 5 and 6, the protocol starts in the Aloha state wherein a station transmits all the packets of the current message in consecutive data slots, as long as no collision is detected. In addition to the data packets, each station also transmits reservation information in its assigned minislot. This RI contains two kinds of information. First, the total number of packets which are outstanding. When a station transmits a packet on the uplink to the satellite, the success or failure of that transmission will not be known until the corresponding data packet is received on the downlink, approximately 0.27 seconds later. Thus, packets are considered to be outstanding when the packet has been transmitted, but the success or failure of the transmission is presently unknown. Second, the total number of packets in the current message that have not been transmitted is also part of the RI. Reservation information received before detection of a collision is discarded. Upon receipt of the first RI after detection of the first collision, however, the protocol switches to the Reservation state. More precisely, the traffic measure $T_{AR}$ for switching from the Aloha state to the Reservation state is the number ($t_{ar}$) of consecutive collisions, followed by the receipt of the first RI, and the threshold value $t_{ar}$ is one collision.

In the Reservation state, each station that has a message to send must first request a reservation for its packets by transmitting an RI in its assigned minislot. In the Reservation state, the transmitted reservation information only contains information regarding the total number of packets to be transmitted in the current message. After a duration of one round trip propagation delay, this transmitted reservation information is received by all ground stations. The received reservation information is stored in a Global Queue (GQ) on a first-in first-out (FIFO) basis. Each station maintains an identical copy of the Global Queue. A station holds a reservation for a number of consecutive data slots equal to the number of slots specified in the corresponding reservation information in the Global Queue.

There is, however, an exception to this rule for which some Special Reservation (RES) State Processing is required. The ASHA protocols use a Go-Back-N (GBN) Automatic Repeat reQuest (ARQ) scheme under which, in the Aloha state, the protocols retransmit collided data packets, plus all subsequent data packets that are outstanding (transmitted, but not yet received) at the time the first collided packet is received by the ground stations. As soon as a collided packet is received followed by the receipt of the first RI, the protocol switches to the Reservation state and the Global Queue begins to accumulate reservation information. During the period of time equal to one round trip propagation delay after receiving the first collided packet and after the protocol switches from the Aloha state to the Reservation state, the ground stations are receiving reservation information that was transmitted in the Aloha state. Recall that reservation information transmitted in the Aloha state includes not only the number of packets to be transmitted in the current message, but also information regarding the number of data packets that are outstanding. This includes the packets which were previously transmitted, successfully received and in proper order, up to the time a station's turn to transmit arrives according to the Global Queue. The number of such packets is subtracted from the number of data slots reserved for the station. Also note that the first packet received in error and all subsequent packets of the same message, even though received without error, need to be retransmitted under the GBN ARQ scheme. Therefore, the number of such packets is added to the number of data slots reserved for the station.

If the Global Queue remains continuously clear, i.e., no station has a reservation stored in the Global Queue, for more than a certain number of slots $t_{ra}$, then all stations switch back to the Aloha state at the beginning of the next slot. The threshold value $t_{ra}$ is a function of the number of time slots per frame, as illustrated in the table of FIG. 6. More precisely, since the number (L) of time slots per frame is related to the number (V) of minislots per large slot (V>=M/L; wherein M is the number of stations), the threshold value $t_{ra}$ is also related to the number of minislots per large slot, as well as the total number of stations on the network.

Note that the traffic measure $T_{AR}$ and the corresponding threshold value $t_{ar}$ for switching from the Aloha state to the Reservation state are the same as in the SRUC protocol. Similarly, the traffic measure $T_{RA}$ for switching from the Reservation state to the Aloha state is the same as in SRUC; the corresponding threshold value $t_{ra}$, however, is different. As discussed above, extensive analysis of the SRUC protocol has demonstrated an instability under certain traffic conditions. This instability results in protocol oscillations, in which the SRUC protocol oscillates excessively between Aloha and Reservation states. By using the threshold values specified in the table of FIG. 6, this instability is cured (for the network parameters M=100 and R=12).

Figure 1:
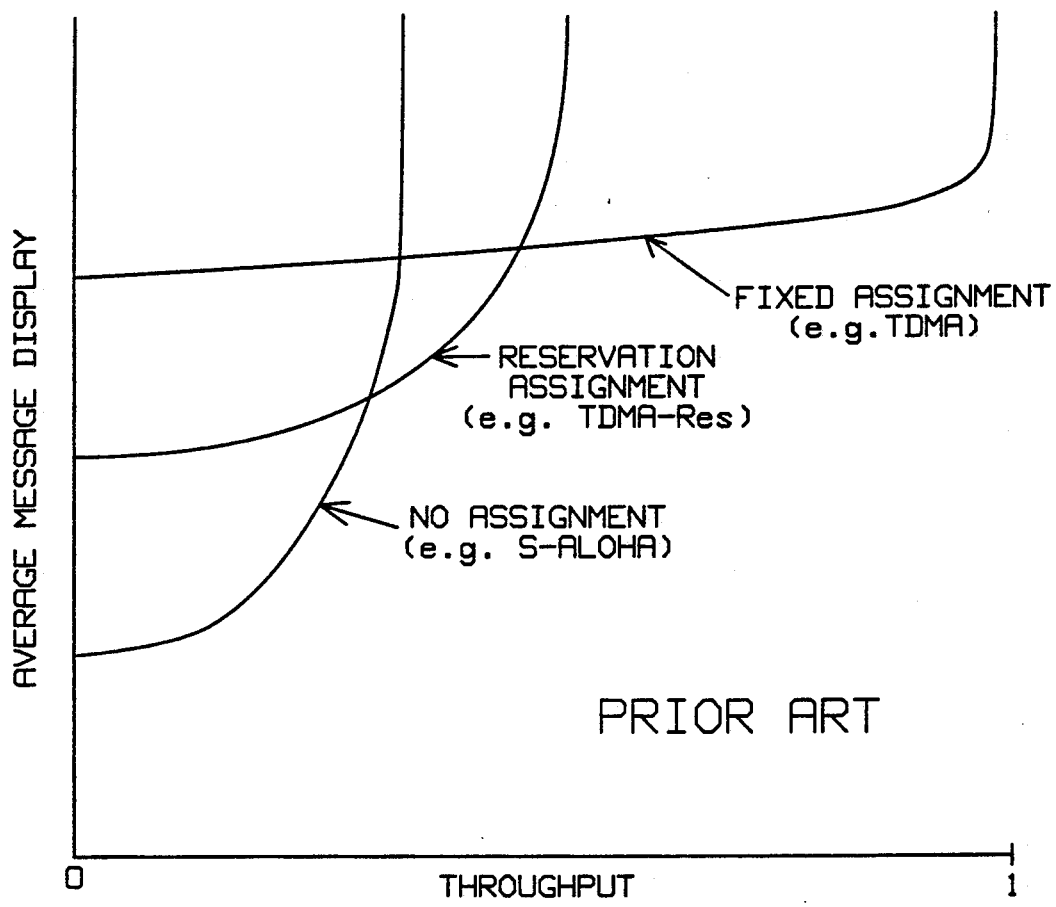
FIG. 1 is a graph of the average message delay versus throughput for Aloha, Reservation and TDMA protocols.

Ideally, the ART class protocols should switch from the Aloha state to the Reservation state at the intersection of the Aloha and Reservation performance curves of FIG. 1. During analysis of the SRUC protocol, wherein $t_{ar}$ is equal to 1, it was discovered by the applicant that this protocol switches from the Aloha state to the Reservation state prematurely, especially when the total number of stations M is large. This premature switching, although not fatal, results in an increase in average message delay over a narrow range of throughput values when compared to the S-ALOHA protocol. Two solutions to this premature switching are presented below.

An improvement in the performance of the ASHA protocols can be achieved by changing the traffic threshold value $t_{ar}$ for switching from the Aloha state to the Reservation state from 1 collision to some number greater than one. This number of collisions $t_{ar}$ is preferably a function of the total number of stations operating on the network.

Recall that the traffic measure $T_{AR}$ is the number of consecutive collisions. Further improvements can also be realized by changing this traffic measure to a "sliding window" that covers a predetermined number of the most recent time slots. When the traffic measure is a sliding window, the $t_{ar}$ collisions required to switch states do not have to be consecutive. Instead, the only requirement is for $t_{ar}$ collisions to occur within a window of size $T_{AR}$.

The traffic measure $T_{RT}$ that determines the switching from the Reservation state to the TDMA state is the number of different stations that have transmitted packets of their current message in a "sliding window" that covers $W_1$ of the most recent large slots. $W_1$ is referred to as the "Res Scan Window" and is equal to M*h, wherein "M" is the number of stations on the network and "h" is the average message size measured in number of packets. The value of h may be determined by observing the recent history of the traffic on the network. If this measure exceeds the threshold value $t_{rt}$ specified in the table of FIG. 6, the protocol switches from the Reservation state to the TDMA state.

Recall that the channel structure changes in the TDMA state. In particular, the channel structure does not include reservation information in the TDMA state. Upon switching to the TDMA state, the data slots are numbered consecutively, beginning with 1. Since each station has a pre-assigned data slot to transmit its packets in, a particular station can transmit a data packet in its pre-assigned data slot by simply counting the number of data slots subsequent to the change to the TDMA state.

If the traffic measure $T_{TR}$ crosses the threshold value $t_{tr}$, the protocol switches out of the TDMA state. However, the protocol can not go immediately to the Reservation state because reservation information is not transmitted in the TDMA state and, consequently, there is no reservation information in the Global Queue with which to assign reserved slots. Thus, the protocol switches to a Transition state for a period of time slightly greater than one round trip propagation delay so that reservation information can be, hopefully, accumulated in the Global Queue.

The traffic measure $T_{TR}$ for switching from the TDMA state to the Transition state is the number of different stations that have transmitted packets during the "TDMA Scan Window," which is a sliding scan window covering $W_2$ of the most recent data slots. $W_2$ is a function of M, the total number of stations on the network and, preferably, $W_2 = M$. If the number of different stations transmitting packets in the TDMA Scan Window drops below the threshold value $t_{tr}$, the protocol switches from the TDMA state to the Transition state. The threshold value $t_{tr}$ is also a function of the number of stations on the network and preferred values of $t_{rt}$ are listed in the table of FIG. 6.

In the Transition state, the channel structure reverts back to the large slot structure, wherein each large slot includes a data slot and a number of minislots. Immediately upon switching to the Transition state the large slots are arbitrarily numbered in sequence beginning with slot number 1. Stations with data packets to send can now transmit reservation information in their pre-assigned minislots. Since reservation information will not be received and entered into the Global Queue until one round trip propagation delay later, the data slots in the Transition state are unreserved. Instead, the stations treat the data slots in the Transition state as fixed assignment slots and continue transmitting data packets in the data slots of the Transition state on a TDMA basis. Although the first large slot in the Transition state is numbered 1, the number of the first data slot in the Transition state is equal to the number of the last data slot transmitted in the TDMA state, plus 1. In other words, there is continuity between the numbering of the data slots in the TDMA state and the Transition state. In most cases, this numbering system results in the data slot, which is a subset of a large slot, having a different number than the large slot which contains it. After a period of time slightly longer than one round trip propagation delay, the protocol reverts to the Reservation state because by then, hopefully, at least one RI has been received to start the Global Queue. This period of time is preferably equal to $J+1$ large slots, wherein J is the number of large slots in one round trip propagation delay.

ASHA2

Figure 7A:
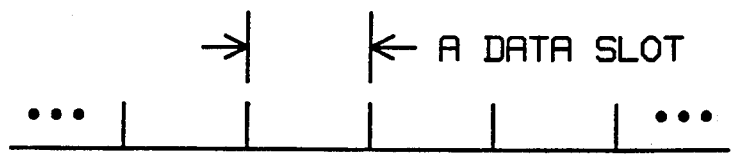
FIGS. 7A–7C are schematic representations of the channel structure of the ALOHA state; AR-Transition, Reservation (RES) and TR-Transition states; and TDMA state of the ASHA2 protocol, respectively.

FIG. 7 is a schematic representation of the channel structure for the ASHA2 protocol. Referring to FIG. 7A, the channel structure in the Aloha state of the ASHA2 protocol is different than the corresponding structure of the ASHA1 protocol. In the Aloha state, the ASHA2 protocol has no frame structure, and the channel is simply divided into a number of consecutive, equal length data slots.

Since reservation information is not transmitted in the Aloha state, the ASHA2 protocol requires an Aloha to Reservation Transition state or "AR-Transition state", such that reservation information may be accumulated in the Global Queue prior to switching to the Reservation state. The ASHA2 protocol, like the ASHA1 protocol, requires a TDMA to Reservation Transition state or "TR-Transition state", to switch from the TDMA state to the Reservation state. The TR-Transition state was referred to as the "Transition state" in the ASHA1 protocol (because the ASHA1 protocol only requires one transition state). Although the terminology is different, these two transition states are identical.

Figure 7B:
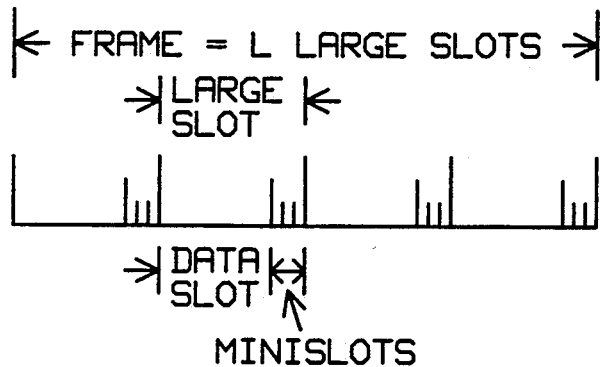

In the Reservation, AR-Transition and TR-Transition states, the channel is divided into frames as shown in FIG. 7B, which are further divided into a plurality of equal length large slots. Each large slot includes a fixed length data slot and a number of reservation minislots. This structure is identical to the structure used in the Aloha, Reservation and Transition states of the ASHA1 protocol.

Figure 7C:
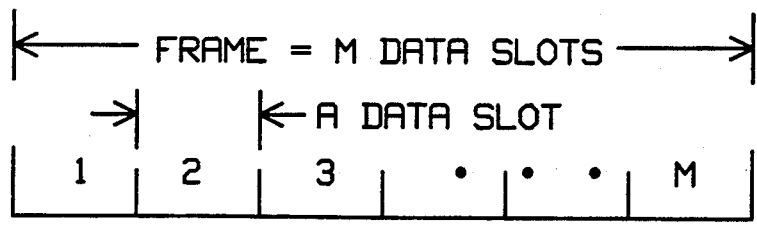

Referring to FIG. 7C, the channel structure used in the TDMA state of the ASHA2 protocol is identical to the structure used in the corresponding state of the ASHA1 protocol. That is, the channel is divided into frames, which are further divided into M equal length data slots, wherein M is the number of stations on the network.

FIG. 8 is a finite state machine model of the ASHA2 protocol. Referring to this figure, the Reservation, TDMA and TR-Transition states are identical to the corresponding states of the ASHA1 protocol. The Aloha state is substantially identical to the Aloha state of ASHA1, except that reservation information is not transmitted in the Aloha state of ASHA2. Thus, a station that has a message to transmit can continuously transmit all the packets of the message in consecutive data slots, as long as no collision occurs. The traffic measure $T_{AR}$ and the corresponding threshold value $t_{ar}$ for switching from the Aloha state to the Reservation state are similar to the ones described with reference to ASHA1, except that the ASHA2 protocol does not wait for the receipt of the first RI after detection of the collision before switching states.

Upon switching to the AR-Transition state, the channel structure changes from data slots only to large slots and large slots are arbitrarily numbered beginning with number 1. The stations continue transmitting their packets in data slots of the large slots as per the S-ALOHA protocol and, on receipt of the first RI, switch to the Reservation state.

In another embodiment, sliding windows can also be used in the traffic measures in a hybrid protocol that does not have a Reservation state, but switches between the Aloha and TDMA states. In this embodiment, if a predetermined number of data packets have collided within a first sliding window of a predetermined number of recently received time slots, the protocol switches from the Aloha state to the TDMA state. Similarly, if a predetermined number of stations have transmitted data packets within a second sliding window of recently received time slots, the protocol switches from the TDMA state to the Aloha state. As before, the predetermined number of stations and the sizes of the sliding windows are preferably a function of the number of time slots per frame.

Implementation

The finite state machine models discussed above fully describe the method of the ASHA1 and ASHA2 protocols, and the general ART class protocols. The physical implementation of these protocols will now be described.

Figure 9:
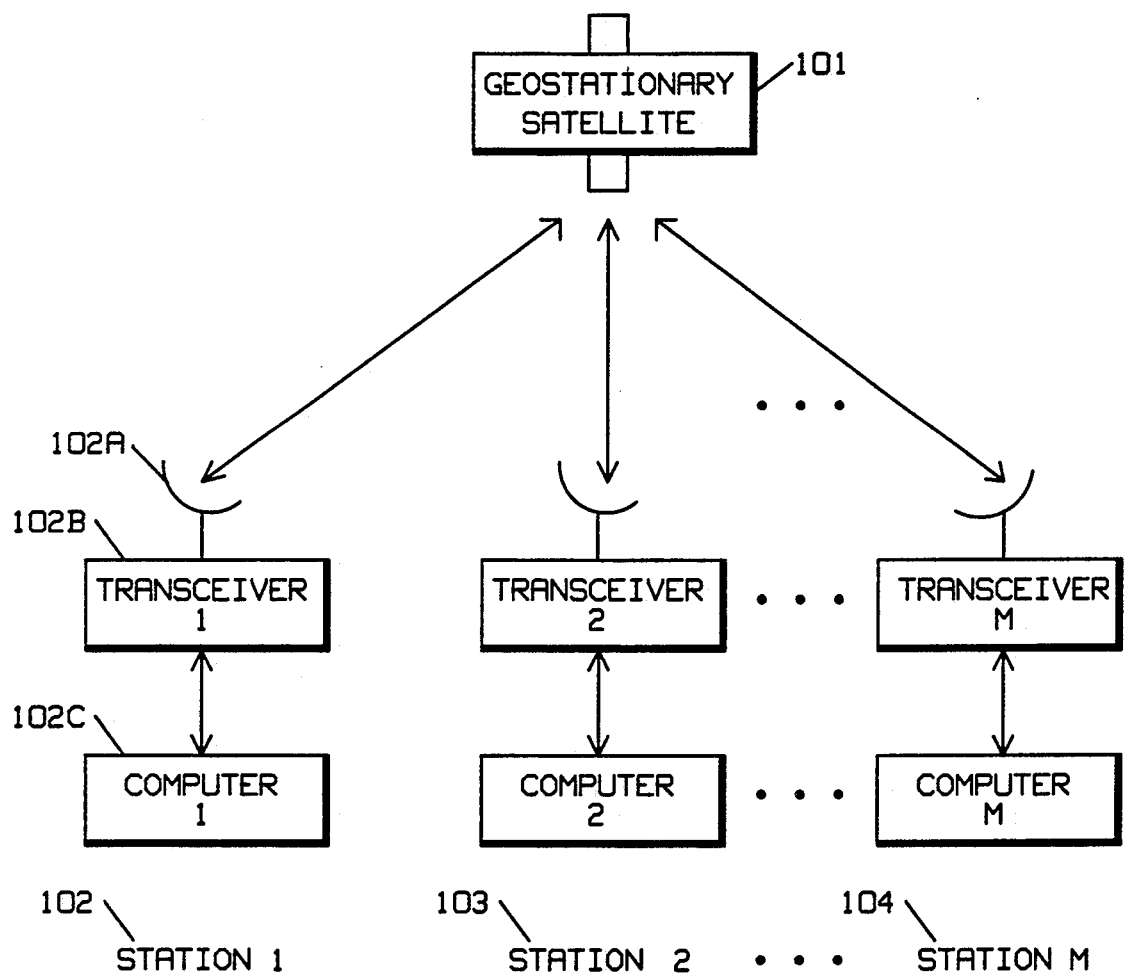
FIG. 9 is a block diagram of a satellite communications system employing an ART class protocol.

FIG. 9 is a block diagram of a satellite communications system suitable for implementing the above described protocols. The system consists of an earth satellite 101, in geosynchronous orbit and having an onboard radio transponder, and a plurality of earth stations 102, 103 and 104. Each of the earth stations, e.g., station 102, includes an antenna 102A, a radio transceiver 102B and a computer or controller 102C. In general, each transceiver and computer includes means for transmitting and receiving packets of information using the three basic multiple access protocols, Aloha, Reservation and TDMA. Also, each of the transceivers and computers includes means for transmitting and receiving reservation information, and for storing this reservation information in a Global Queue. Each of the above described elements is well known in the art.

A computer implementation of the ASHA1 and ASHA2 protocols is described, In general, a program that emulates the flowcharts of FIGS. 10-19 provides the means for switching between each of the basic multiple access protocols, Aloha, Reservation and TDMA, and this program is stored in the computers, e.g., 102C, at each of the stations of the communications system. Although a satellite communications system has been described, programs emulating these flowcharts can easily be modified as described above for use in other communications systems, such as local area networks (LANs) and radio networks.

Figure 10:
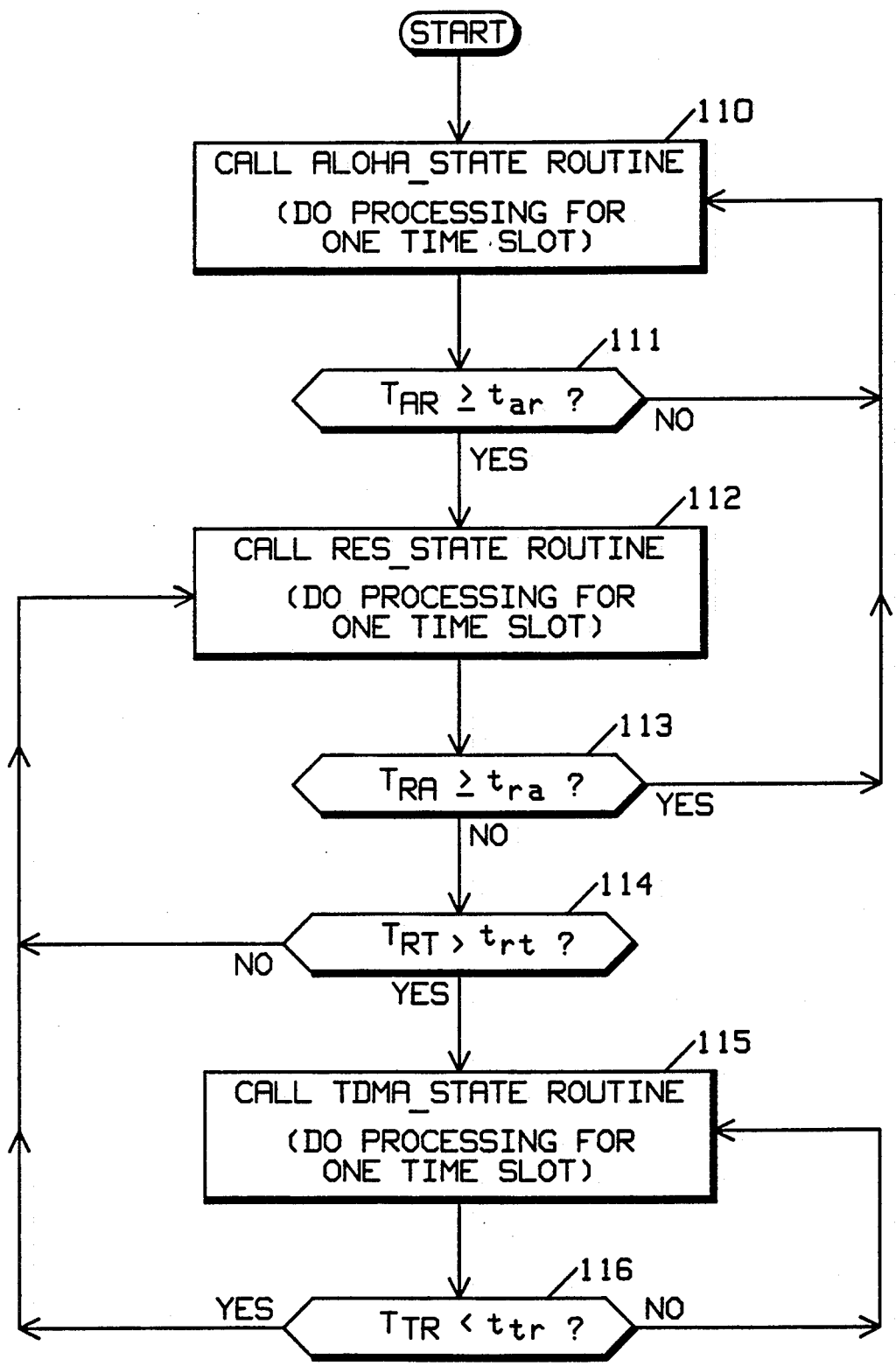
FIG. 10 is a general flowchart of the ART class protocols.

FIG. 10 is a general flowchart of the overall ART class protocols. Referring to this figure, the Aloha state routine is called in step 110 and executed for one time slot. Upon returning, if the traffic measure $T_{AR}$ is less than the threshold value $t_{an}$ the program branches at step 111 back to step 110 wherein the Aloha state routine is called again and executed at the next time slot. If the traffic measure equals or exceeds the threshold value, the program branches to step 112 wherein the Reservation state routine is called and executed for one time slot. Upon returning, if the traffic measure $T_{RA}$ is greater than or equal to the threshold value $t_{ra}$, the program branches at step 113 back to step 110 wherein the Aloha state routine is called again and executed at the next time slot. If the traffic measure $T_{RA}$ is less than $t_{ra}$ and the traffic measure $T_{RT}$ is less than or equal to $t_{rt}$, the program branches at steps 113 and 114 back to step 112 wherein the Reservation state routine is called again. If $T_{RA}$ is less than $t_{ra}$ and $T_{RT}$ is greater than $t_{rt}$, the program branches at steps 113 and 114 to step 115, wherein the TDMA state routine is called and executed for one time slot. Upon returning, if the traffic measure $T_{TR}$ is greater than or equal to the threshold value $t_{tr}$, the program branches at step 116 back to step 115, wherein the TDMA state is called again. If $T_{TR}$ is less than $t_{tr}$, the program branches at step 116 back to step 112, wherein the Reservation state routine is called again.

Figure 11:
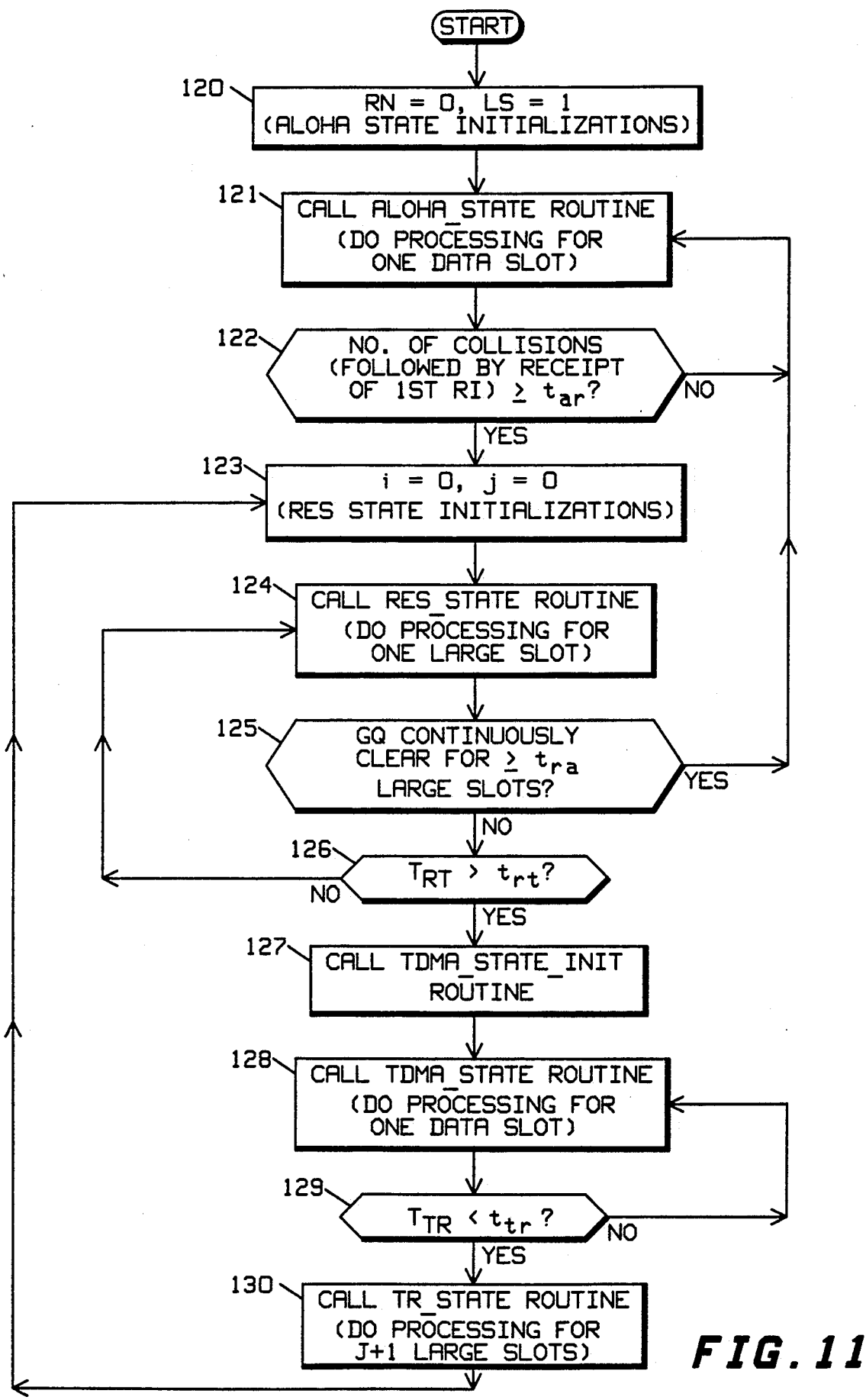
FIG. 11 is an overall flowchart of the ASHA1 protocol.

FIG. 11 is a flowchart of the overall ASHA1 protocol. Referring to this figure, the variables RN and LS for the Aloha state routine are initialized in step 120. In next step 121, the Aloha state routine (FIG. 13) is called and executed for one time slot. Upon returning if the total number of received data packet collisions (followed by receipt of the first RI) equals or exceeds the threshold value $t_{ar}$ the program branches at step 122 to step 123. Otherwise, the program branches back to step 121 wherein the Aloha state routine is called and executed at the next time slot. If the threshold value $t_{ar}$ is one collision, step 122 is quite simple because the processor only has to look at the present received data packet to determine if a collision has occurred and from then on to continue branching back to step 121 until the first RI is received.

In step 123 the variables i and j are both initialized to zero. In next step 124, the Reservation state routine (FIG. 15) is called and executed for one time slot. If the Global Queue (GQ) has been continuously clear for a number of large slots greater than or equal to the threshold value $t_{ra}$, the program branches at step 125 back to step 121, wherein the Aloha state routine is called again. Otherwise, the program branches to step 126. In step 126, if the traffic measure $T_{RT}$ is greater than the threshold value $t_{rt}$, the program branches to step 124, wherein the Reservation state routine is called again. Otherwise, the program branches to step 127. Recall that the traffic measure $T_{RT}$ is the number of different stations that have transmitted packets in the Res Scan Window $W_1$.

In step 127, the TDMA state Initialization routine (FIG. 18) is called. Upon returning from the Initialization routine, the TDMA state routine (FIG. 19) is called in next step 128 and executed for one time slot. If $T_{TR}$ is less than $t_{tr}$, the program branches at step 129 back to step 128 wherein the TDMA state routine is called again. Otherwise, the program branches at step 129 to step 130 wherein the TR-Transition state routine (FIG. 19) is called and executed for J+1 time slots. Then the program branches back to step 123 wherein the Reservation state variables are re-initialized.

Figure 12A:
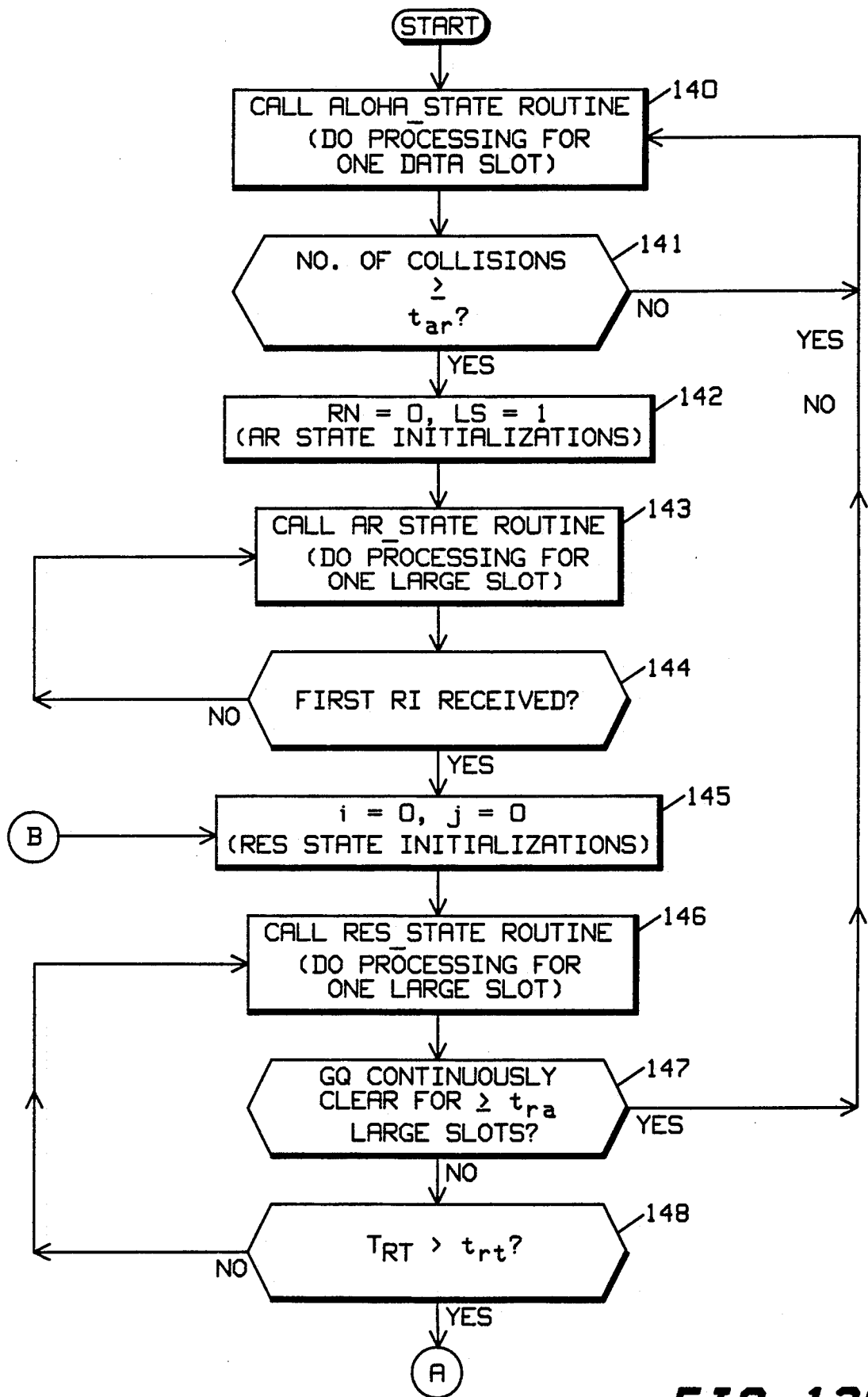
FIGS. 12A and 12B include an overall flowchart of the ASHA2 protocol.
Figure 12B:
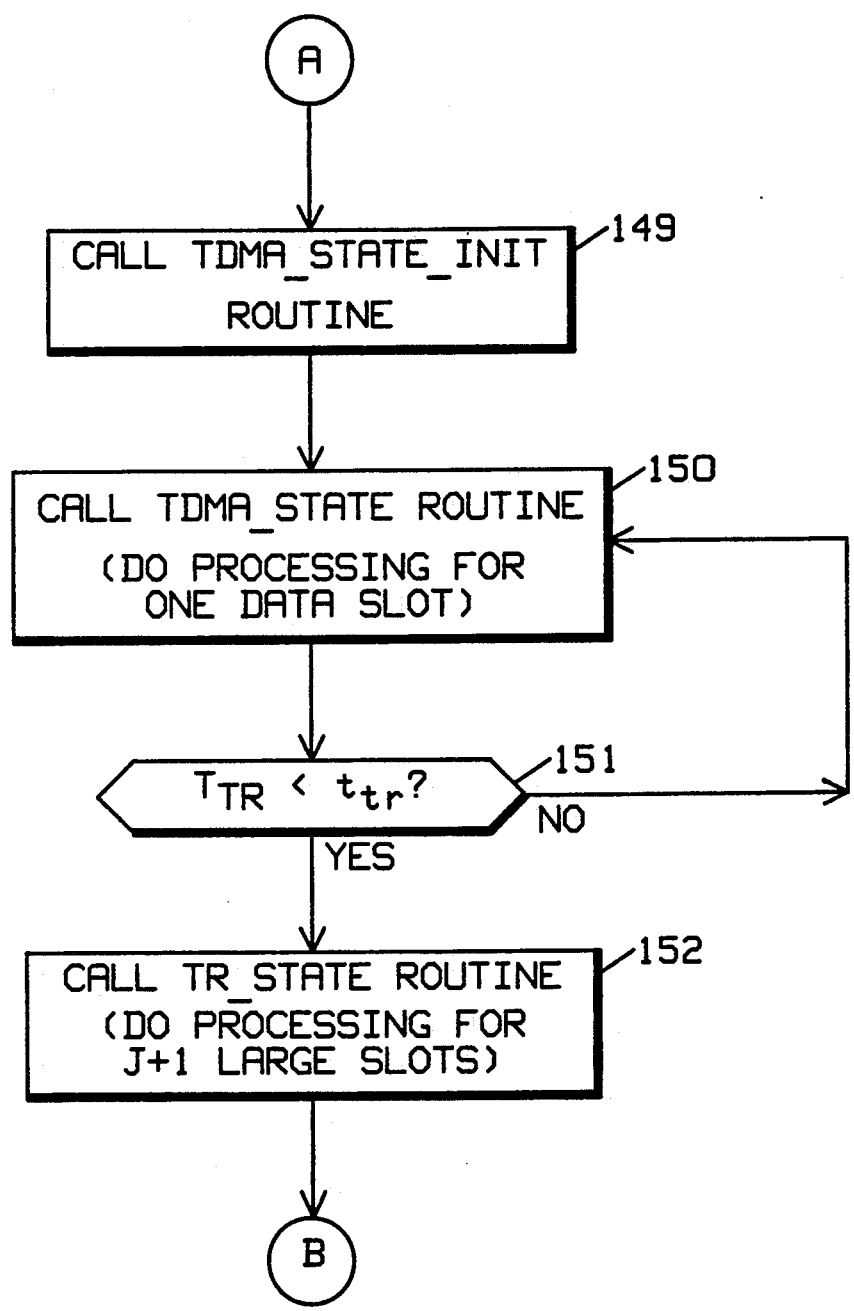

In FIG. 12, a flow chart of the overall ASHA2 protocol is illustrated. Referring to this figure, the Aloha state routine (FIG. 14) is called in step 140 and executed for one time slot. If the number of collisions is less than the threshold value $t_{ar}$ (e.g., 1), the program branches at step 141 back to step 140 wherein the Aloha state routine is called again. If the number of collisions exceeds $t_{ar}$, the program branches at step 141 to step 142 wherein the variable RN and LS are initialized to zero and one, respectively. In next step 143, the AR-Transition state routine (FIG. 13) is called and executed for one time slot. The program branches at step 144 back to step 143 until the first reservation information RI is received. Upon receiving the first RI, the program branches at step 144 to step 145. In step 145, the Reservation state variables i and j are initialized to zero. In next step 146, the Reservation state routine is called and executed for one time slot. Upon returning, the program branches at steps 147 and 148 back to step 146 if the Global Queue GQ has been continuously clear for less than $t_{ra}$ slots and the traffic measure $T_{RT}$ is not greater than the threshold value $t_{rt}$ Recall that the traffic measure $T_{RT}$ is the sliding number of stations that have transmitted packets in the sliding Res Scan Window.

Upon returning from step 146, the program branches at step 147 back to step 140 wherein the Aloha state routine is called again if the Global Queue has been continuously clear for at least $t_{ra}$ slots. If the Global Queue has not been clear for this number of slots and the number of stations that have transmitted packets in the sliding Res Scan Window exceeds the threshold value $t_{rt}$, the program branches at steps 147 and 148 to step 149.

In step 149, the TDMA state Initialization routine (FIG. 18) is called. Upon returning, the program goes to step 150 wherein the TDMA state routine is called and executed for one time slot. Upon returning, if the traffic measure $T_{TR}$ is not less than the threshold value $t_{tr}$, the program branches at step 151 back to step 150 wherein the TDMA state routine is called again. Recall that $T_{TR}$ is the number of stations that have transmitted packets in the sliding TDMA Scan Window. If this number is less than $t_{tr}$, the program branches at step 151 to step 152, wherein the TR-Transition state is called and executed for J+1 time slots. Then the program branches at step 152 back to step 145 wherein the Reservation state variables are re-initialized.

Figure 13:
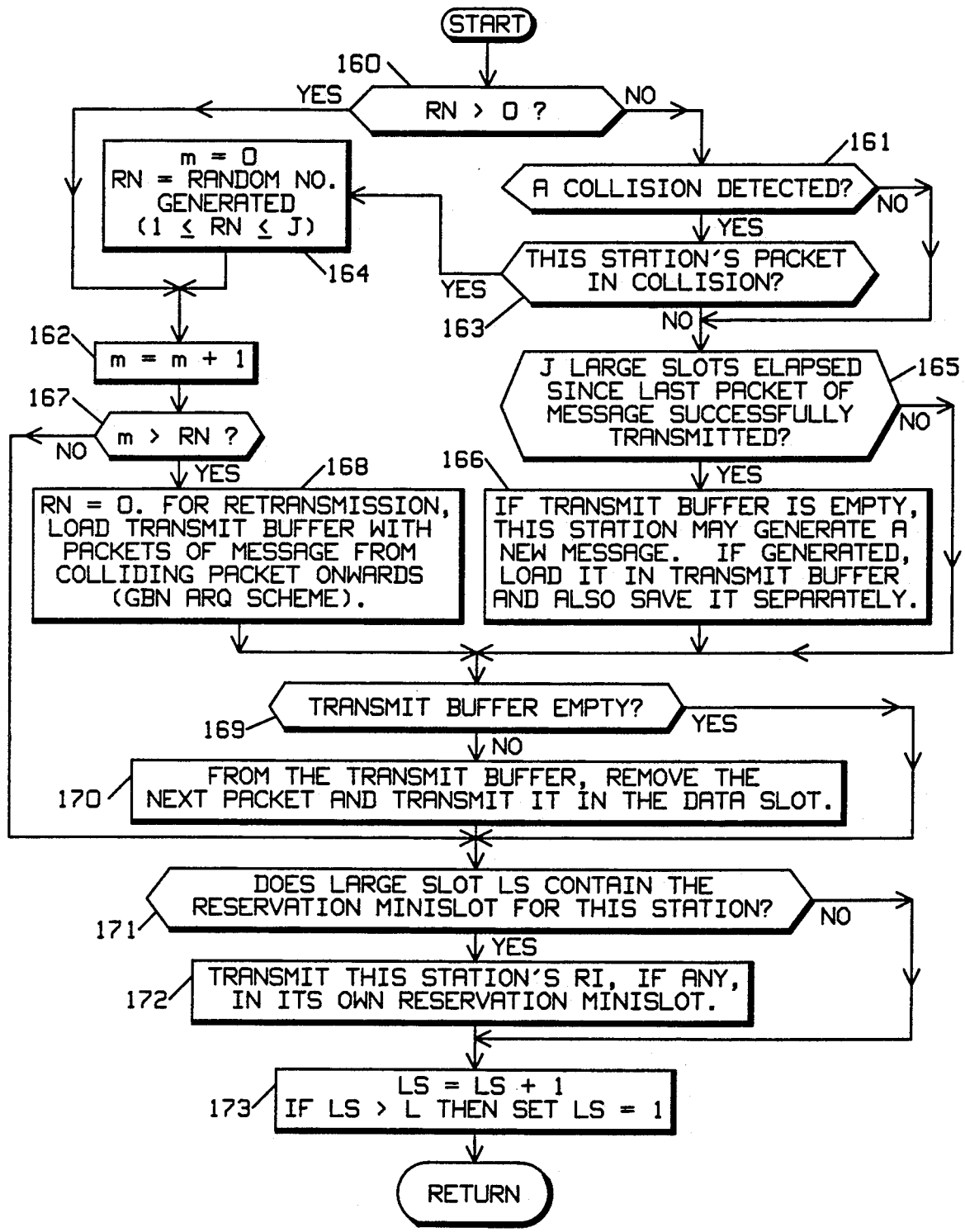
FIG. 13 is a flowchart of the ASHA1 ALOHA state and ASHA2 AR-Transition state routines.

FIG. 13 is a flowchart of the ASHA1 Aloha state and the ASHA2 AR-Transition state routine. Referring to this figure, if the previously generated or initialized random number RN is greater than zero, the program branches at step 160 to step 162 wherein the variable m is incremented. If RN is equal to or less than zero, the program branches to step 161. If a collision of two or more data packets is detected in step 161, the program branches to step 163. In step 163, if one of the collided data packets was transmitted by this station, it needs to retransmit some of its packets as per the GBN ARQ scheme. Thus, the program branches to step 164 wherein the variable m is set to zero and the variable RN is set equal to a generated random number between 1 and J, J being the number of large slots in one round trip propagation delay. After completing step 164, the program proceeds to step 162. Returning to steps 161 and 163, if no collision has been detected, or if a collision has occurred but the collision did not involve a data packet belonging to this station, the program branches to step 165.

After one round trip propagation delay since the last data packet of a message was transmitted and that packet is successfully received, the program branches at step 165 to step 166 wherein a new message can be loaded to the transmit buffer. The transmit buffer is a well known buffer in which the current message is organized into data packets and temporarily stored for subsequent transmission. After completing step 166, the program advances to step 169.

Step 167 follows step 162. To enter the AR-Transition state, a collision must have occurred in the Aloha state. Since no reservation information is available in the AR-Transition state and the collided data packets must be retransmitted, the colliding stations retransmit the collided data packets on a contention basis, but in time slots that are randomly chosen in an attempt to prevent the same data packets from colliding a second time. Thus, each station generates its own and, hopefully, unique random number RN. The purpose of variable m is to count the number of time slots that have elapsed in the AR-Transition state such that when m exceeds RN the station may begin to retransmit the first collided data packet and subsequent data packets (recall that the ASHA protocols use a GBN ARQ scheme). Thus, if m exceeds RN, the program branches at step 167 to step 168 wherein RN is reset to zero and the data packets from the collided packet onward are loaded into the transmit buffer. If the transmit buffer contains packets for transmission, the program branches at step 169 to step 170 wherein the next packet in the buffer is transmitted. If the transmit buffer becomes empty, the program branches at step 169 to step 171.

The value of the variable LS is indicative of the number of the current large slot. In step 171, if the current large slot contains the reservation minislot for this station, the program branches to step 172 wherein the stations reservation information RI is transmitted in its assigned minislot. If the current large slot does not contain this station's minislot, the program branches to step 173 wherein the variable LS is incremented by 1, and if it reaches a value greater than L (L is the frame size as measured in large slots), then LS is set equal to 1.

Figure 14:
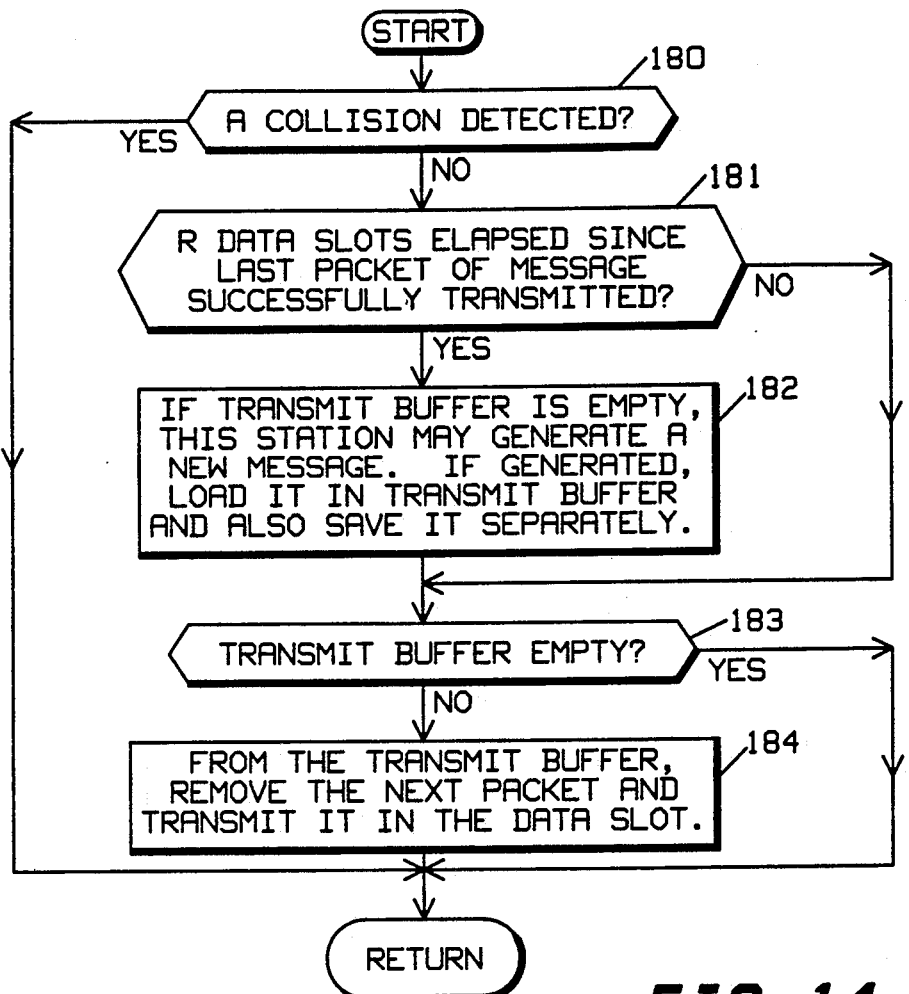
FIG. 14 is a flowchart of the ASHA2 ALOHA state routine.

FIG. 14 is a flowchart of the ASHA2 Aloha state routine. Referring to this figure, if a collision of two or more data packets is detected, the program branches at step 180 and returns to the overall ASHA2 protocol routine of FIG. 12. If no collision is detected, the program branches to step 181. In the flowchart, "R" is the number of data slots in one round trip propagation delay (recall that ASHA2 protocol uses data slots only). If R data slot have elapsed since the last packet of the current message was transmitted and that packet is successfully received, the program branches at step 181 to step 182; otherwise the program branches to step 183. In step 182, as in step 166 of FIG. 13, if the transmit buffer is empty, a new message may be loaded into the buffer. In next step 183, if the transmit buffer is empty, the program returns to the overall ASHA2 flowchart of FIG. 12. If the transmit buffer is not empty, the program branches to step 184 wherein the next data packet is removed from the buffer and transmitted.

Figure 15:
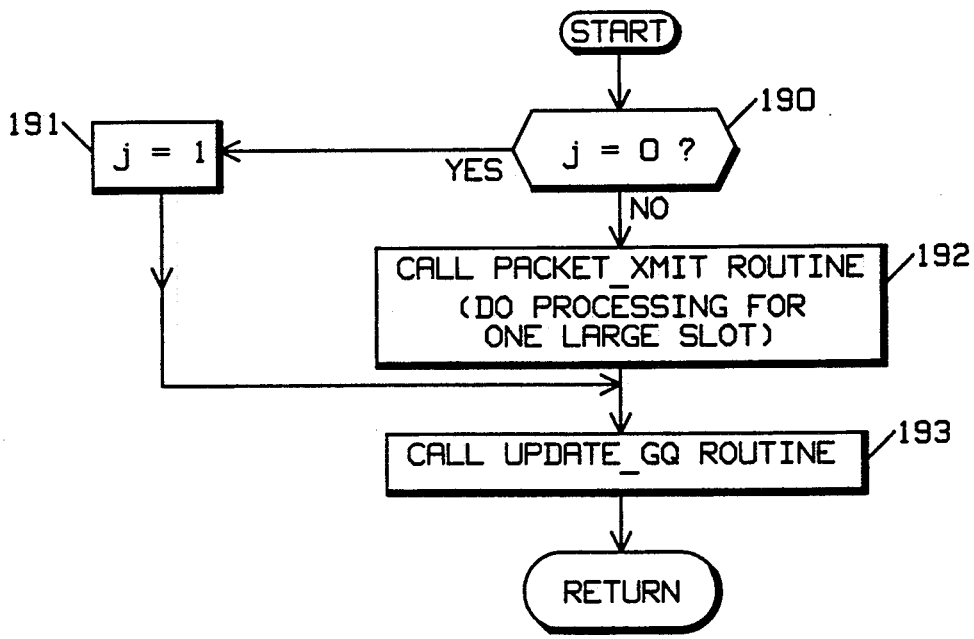
FIG. 15 is an overall flowchart of the Reservation (RES) state routine.

FIGS. 15-19 are applicable to both ASHA1 and ASHA2 protocols. FIG. 15 is a flowchart of the overall Reservation state routine. Referring to this figure, the variable j is initialized to zero in the Overall ASHA1 and ASHA2 routines (FIGS. 11 and 12) before switching to the Reservation state from the previous state. Thus, the first time this Reservation state routine is called, j is equal to 0 and the program branches at step 190 to step 191, wherein j is set equal to 1. The program then proceeds to step 193, bypassing step 192. Consequently, the purpose of the variable j is to cause the program to bypass step 192, which is the subroutine call for the Packet Transmit routine, immediately after switching to the Reservation state from the previous state. Subsequently, if the station remains in the Reservation state, j will be equal to 1 and the program will branch at step 190 to step 192 wherein the Packet Transmit routine is called. In next step 193, the Update Global Queue routine is called.

Figure 16:
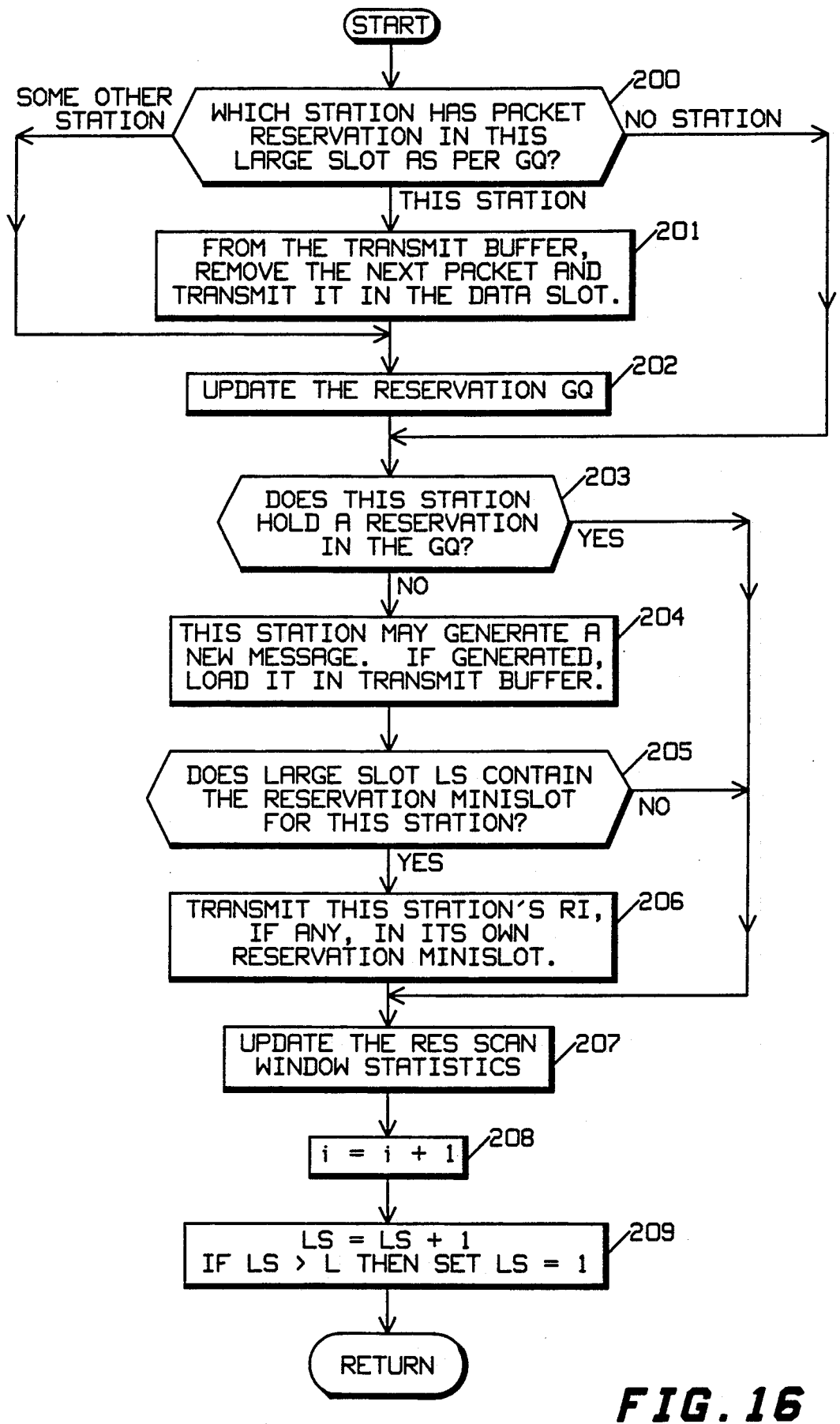
FIG. 16 is a flowchart of the Packet Transmit (PACKET_XMIT) routine of the Reservation state.

FIG. 16 is a flowchart of the Packet Transmit (PACKET_XMIT) routine of the Reservation state. Referring to this figure, if this station has a reservation to transmit a data packet in the current large slot, as determined by the large slot pointer LS, the program branches at step 200 to step 201 wherein the next packet is removed from the transmit buffer and transmitted in the current data slot before proceeding to step 202. If some other station has a reservation to transmit a data packet in the current slot, the program branches to step 202 wherein the Global Queue is updated by subtracting one from the number of packets reserved for either this station or that other station. If no station holds a reservation for the current slot, the program branches to step 203.

If this station holds a reservation in the Global Queue, the program branches to step 207 wherein the Reservation (RES) Scan Window statistics are updated. These statistics are simply a count of the number of stations that have transmitted packets of their messages in the sliding window of the most recent M*h large slots. If this station does not hold a reservation in the Global Queue, its transmit buffer is empty and the program branches to step 204, wherein a new message may be loaded into the transmit buffer. In next step 205, if the current large slot contains the minislot for this station, the program branches to step 206 wherein the reservation information, if any, is transmitted in the assigned minislot. If the current large slot does not contain this stations minislot, the program branches to step 207. In next step 208, the variable i is incremented and in step 209, the large slot pointer LS is incremented by 1. If LS is greater than L, however, LS is set equal to 1 (recall that L is the number of large slots in frame).

Figure 17:
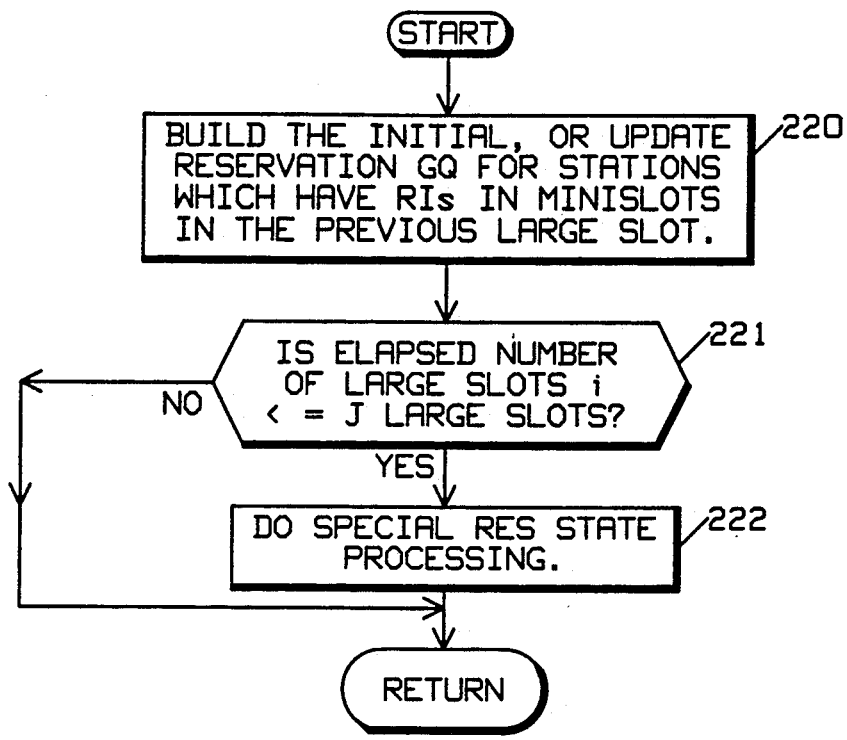
FIG. 17 is a flowchart of the Update Global Queue (UPDATE_GQ) routine of the Reservation state.

FIG. 17 is a flowchart of the Update Global Queue (UPDATE_GQ) routine of the Reservation state. Referring to this figure, the Global Queue is updated in step 220 according to the reservation information that was received in the last large slot. If the variable i is less than or equal to J (recall that J is the number of large slots in one round trip propagation delay) the program branches at step 221 to step 222 wherein the adjustments occur to the Global Queue as per Special RES State Processing as described above. It should be apparent that the function of the variable i is to count the number of large slots after transitioning to the Reservation state so that the program can be directed to the special processing step during the one round trip propagation delay interval immediately following the transition.

Figure 18:
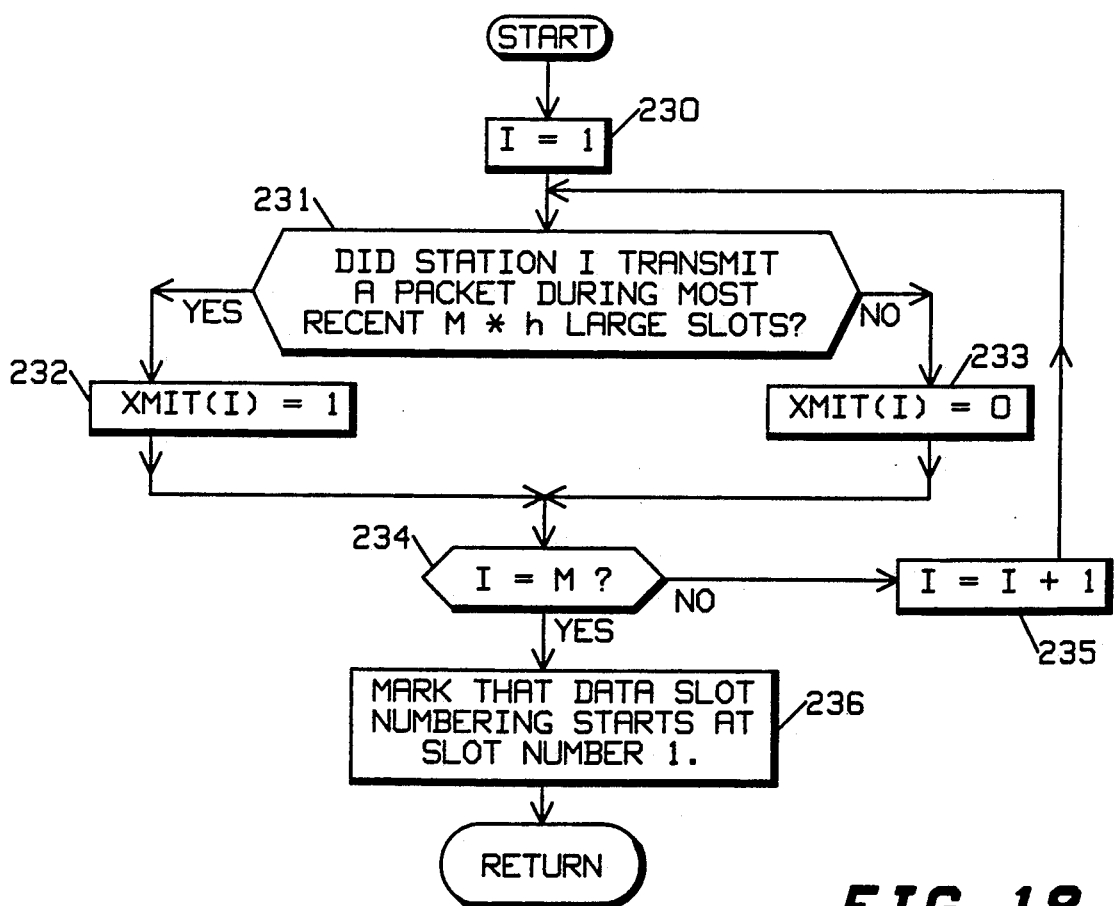
FIG. 18 is a flowchart of the TDMA State Initialization routine.

FIG. 18 is a flowchart of the TDMA state Initialization routine. Referring to this figure, the variable I is initialized to 1 in step 230. The variable I is used to consecutively point to each of the M stations on the network. If the Ith station transmitted a packet during the sliding window of the most recent M*h large slots (recall that M is the number of stations on the network), then the program branches at step 231 to step 232, wherein the Ith entry in the Transmit Array "XMIT" is set equal to 1. If the Ith station did not transmit during the most recent M*h large slots, the program branches to step 233 wherein the Ith entry of the XMIT array is set equal to zero. If I is not equal to M, the program branches at step 234 to step 235, wherein I is incremented and the process of updating the XMIT array is repeated for the next value of I. If I is equal to M, the program branches to step 236 wherein the next data slot is labeled slot number 1.

Figure 19A:
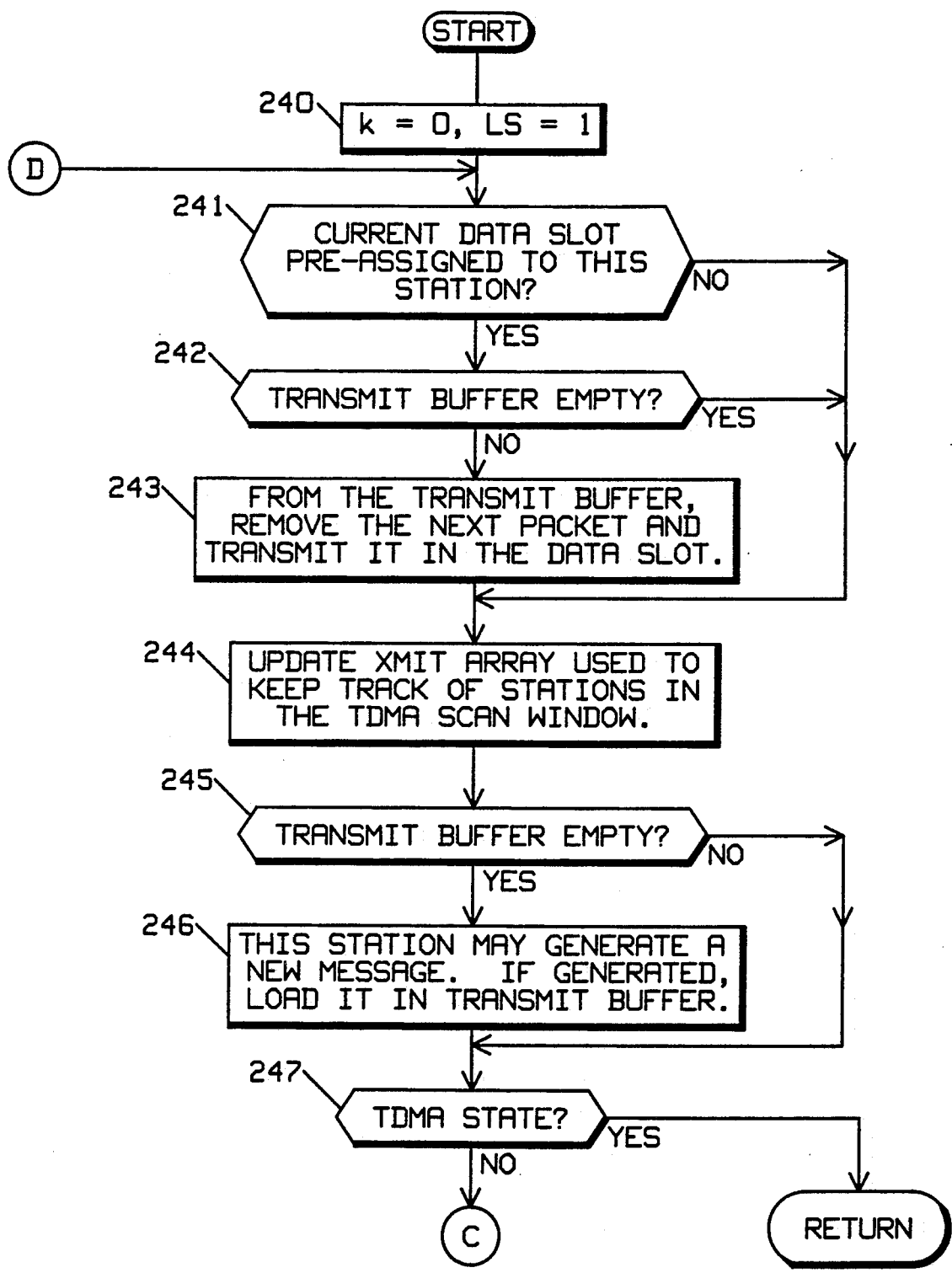
FIGS. 19A and 19B include a flowchart of the TDMA state and TR-Transition state routines.
Figure 19B:
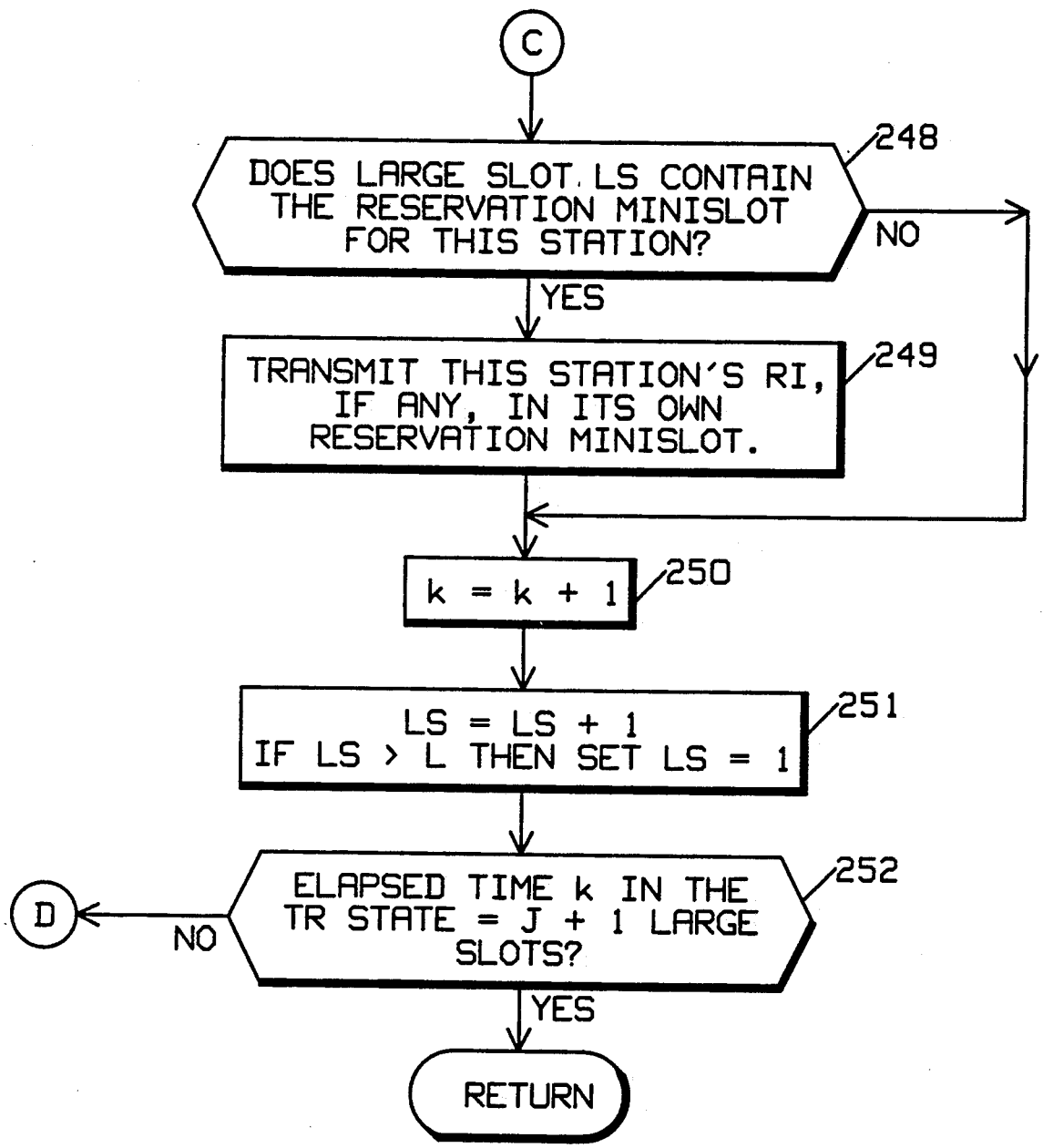

FIG. 19 is a flowchart of the TDMA state and TR-Transition state routines. Referring to this figure, in step 240 the variables k and LS are initialized to 0 and 1, respectively. The variable k is used to count the number of large slots in the TR-Transition state in order to switch the program to the Reservation state after J+1 large slots have elapsed in this transition state. If the current data slot is pre-assigned to this station, the program branches at step 241 to step 242. If the current data slot is not assigned to this station, the program branches to step 244. If the transmit buffer is empty, the program branches at step 242 to step 244 also. If the transmit buffer is not empty, however, the program proceeds to next step 243. In step 243, the next data packet is removed from the transmit buffer and transmitted in the current data slot.

In step 244, the XMIT array is updated by a procedure which is essentially similar to that of FIG. 18, except that in step 231 the sliding scan window size of M slots is used instead of M*h. If the transmit buffer is not empty, the program branches at step 245 to step 247. If the transmit buffer is empty, the program proceeds to next step 246 wherein a new message may be loaded into the transmit buffer. If the protocol is in the TDMA state, the program returns after step 247. If the protocol is in the TR-Transition state, the program proceeds to next step 248, wherein additional TR-Transition state processing begins.

If the current large slot contains the reservation minislot for this station, the program proceeds from step 248 to next step 249 wherein the reservation information (RI), if any, is transmitted in the pre-assigned minislot. If the current large slot does not contain the reservation minislot for this station, the program branches to step 250, wherein the variable k is incremented by 1. In next step 251, LS is also incremented by 1; but if LS is greater than L (the frame size as measured in large slots) then LS is set equal to 1. In next step 252, if k is equal to J+1, the program returns. If k is less than J+1, the program branches back to step 241 to continue the TR-Transition state processing.

I claim as my invention:

1. A communications station for use on a single channel, time division, multiple access information network, said single channel being divided into a plurality of time slots, said communications station comprising in combination:
    selectable Aloha protocol means for transmitting and receiving message information packets using an Aloha protocol;
    selectable Reservation protocol means for transmitting and receiving message information packets using a Reservation protocol;
    reservation information means for transmitting and receiving reservation information;
    a reservation queue for storing reservation information transmitted on said network and received by said reservation information means; and
    means for switching from said Reservation protocol means to said Aloha protocol means when said reservation queue has been clear for a predetermined non-zero number of time slots.

2. The communications station of claim 1, wherein:
    when said Reservation protocol means is selected, each of said time slots includes a predetermined number of minislots for the transmission of said reservation information; and
    said predetermined non-zero number of time slots is dependent on the number of minislots per time slot.

3. The communications station of claim 1, further comprising means for switching from said Aloha protocol means to said Reservation protocol means when a predetermined number of information packets have collided within a predetermined window, said window being a predetermined number of recently received time slots.

4. A communications station for use on a single channel, time division, multiple access network, said single channel being divided into a plurality of time slots, said communications station comprising in combination;

selectable Reservation protocol means for transmitting and receiving message information packets using a Reservation protocol;

selectable TDMA protocol means for transmitting and receiving message information packets using a TDMA protocol;

means for switching from said Reservation protocol means to said TDMA protocol means when more than a first predetermined number of stations operating on said network having transmitted information packets within a first predetermined window, said first window being a first predetermined number of recently received time slots.

5. The communications station of claim 4, wherein:

when said Reservation protocol means is selected, each of said time slots includes a predetermined number of minislots for the transmission of reservation information; and said first predetermined number of stations is dependent on the number of minislots per time slot.

6. The communications station of claim 4, wherein:

each station operating on said network transmits messages, each message including at least one information packet; and the size of said first window is dependent on the number of stations operating on said network and the average number of packets in each message.

7. The communications station of claim 4, further comprising:

means for switching from said TDMA protocol means to said Reservation protocol means when less than a second predetermined number of stations operating on said network have transmitted information packets within a second predetermined window, said second window being a second predetermined number of recently received time slots.

8. The communications station of claim 7, wherein:

said single channel is organized into a plurality of frames, each of said frames including a plurality of said time slots; and said second predetermined number of stations is dependent on the number of time slots per frame.

9. The communications station of claim 7, wherein the size of said second window is dependent on the number of time slots per frame.

10. A communications station for use on a single channel, time division, multiple access network, said single channel being divided into a plurality of time slots, said communications station comprising in combination;

selectable Aloha protocol means for transmitting and receiving message information packets using an Aloha protocol;

selectable Reservation protocol means for transmitting and receiving message information packets using a Reservation protocol;

selectable TDMA protocol means for transmitting and receiving message information packets using a TDMA protocol;

first switching means for switching between said Aloha protocol means and said Reservation protocol means; and second switching means for switching between said Reservation protocol means and said TDMA protocol means.

11. The communications station of claim 10, further comprising:

reservation information means for transmitting and receiving reservation information;

a reservation queue for storing reservation information transmitted on said network and received by said reservation information means; and wherein said first switching means includes means for switching from said Reservation protocol means to said Aloha protocol means when said reservation queue has been clear for a predetermined non-zero number of time slots.

12. The communications station of claim 11, wherein:

when said Reservation protocol means is selected, each of said time slots includes a predetermined number of minislots for the transmission of reservation information; and said predetermined non-zero number of time slots is dependent on the number of minislots per time slot.

13. The communications station of claim 10, wherein said first switching means includes means for switching from said Aloha protocol means to said Reservation protocol means when a predetermined number of information packets have collided within a predetermined window, said window being a predetermined number of recently received time slots.

14. The communications station of claim 10, wherein:

said second switching means includes means for switching from said Reservation protocol means to said TDMA protocol means when more than a predetermined number of stations operating on said network have transmitted information packets within a predetermined window, said window being a predetermined number of recently received time slots.

15. The communications station of claim 14, wherein:

when said Reservation protocol means is selected, each of said time slots includes a predetermined number of minislots for the transmission of reservation information; and said predetermined number of stations is dependent on the number of minislots per time slot.

16. The communications station of claim 14, wherein:

each station operating on said network transmits messages, each message including at least one information packet; and the size of said window is dependent on the number of stations operating on said network and the average number of packets in each message.

17. The communications station of claim 10, wherein:

said second switching means includes means for switching from said TDMA protocol means to said Reservation protocol means when less than a predetermined number of stations operating on said network have transmitted information packets within a predetermined window, said window being a second predetermined number of recently received time slots.

18. The communications station of claim 17, wherein:

said single channel is organized into a plurality of frames, each of said frames including a plurality of said time slots; and said predetermined number of stations is dependent on the number of time slots per frame.

19. The communications station of claim 17, wherein the size of said window is dependent on the number of time slots per frame.

20. A communications station for use on a single channel, time division, multiple access network, said single channel being divided into a plurality of time slots, said communications station comprising in combination:

selectable Aloha protocol means for transmitting and receiving message information packets using an Aloha protocol;

selectable TDMA protocol means for transmitting and receiving message information packets using a TDMA protocol;

means for switching from said Aloha protocol means to said TDMA protocol means when a predetermined number of information packets have collided within a first predetermined window, said first window being a first predetermined number of recently received time slots.

21. The communications station of claim 20, further comprising:

means for switching from said TDMA protocol means to said Aloha protocol means when less than a predetermined number of stations operating on said network have transmitted information packets within a second predetermined window, said second window being a second predetermined number of recently received time slots.

22. The communications station of claim 21, wherein:

said single channel is organized into a plurality of frames, each of said frames including a plurality of said time slots; and said predetermined number of stations is dependent on the number of time slots per frame.

23. The communications station of claim 21, wherein the size of said second window is dependent on the number of time slots per frame.

* * * * *